(12) United States Patent
Dawes et al.

(10) Patent No.: US 8,468,852 B2
(45) Date of Patent: Jun. 25, 2013

(54) SOOT PRESSING FOR OPTICAL FIBER OVERCLADDING

(75) Inventors: Steven Bruce Dawes, Corning, NY (US); Andrey V Filippov, Painted Post, NY (US); Ming-Jun Li, Horseheads, NY (US); Douglas H. Jennings, Corning, NY (US); Valery A. Kozlov, Painted Post, NY (US); Pushkar Tandon, Painted Post, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 293 days.

(21) Appl. No.: 12/958,456

(22) Filed: Dec. 2, 2010

(65) Prior Publication Data

US 2011/0132038 A1      Jun. 9, 2011

Related U.S. Application Data

(60) Provisional application No. 61/266,311, filed on Dec. 3, 2009.

(51) Int. Cl.
    *C03B 19/09*        (2006.01)

(52) U.S. Cl.
    USPC .............. 65/409; 65/17.3; 65/412; 65/408

(58) Field of Classification Search
    None
    See application file for complete search history.

(56) References Cited

U.S. PATENT DOCUMENTS

| | | | | |
|---|---|---|---|---|
| 4,273,178 A | * | 6/1981 | Goloff | 164/457 |
| 4,395,270 A | | 7/1983 | Blankenship et al. | 65/3.12 |
| 4,501,601 A | * | 2/1985 | Haupt | 65/399 |
| 4,834,786 A | * | 5/1989 | Yamauchi et al. | 65/412 |
| 4,961,767 A | * | 10/1990 | Schermerhorn et al. | 65/427 |
| 5,049,175 A | * | 9/1991 | Ross et al. | 65/427 |
| 5,244,485 A | * | 9/1993 | Hihara et al. | 65/412 |
| 5,352,259 A | * | 10/1994 | Oku et al. | 65/412 |
| 5,711,215 A | * | 1/1998 | Sextl et al. | 100/211 |
| 7,143,609 B2 | | 12/2006 | Aitken et al. | 65/26 |
| 7,144,236 B2 | | 12/2006 | Wang et al. | 425/52 |
| 7,200,309 B2 | | 4/2007 | Berkey et al. | 385/127 |
| 7,647,792 B2 | * | 1/2010 | Ichii et al. | 65/415 |
| 2003/0107864 A1 | | 6/2003 | Mazlout et al. | 361/234 |
| 2004/0144134 A1 | | 7/2004 | McDonald et al. | 65/398 |
| 2008/0065218 A1 | | 3/2008 | O'Neil | 623/17.16 |
| 2008/0087303 A1 | | 4/2008 | Fletcher et al. | 134/26 |
| 2009/0130435 A1 | | 5/2009 | Aghajanian et al. | 428/331 |

FOREIGN PATENT DOCUMENTS

| | | |
|---|---|---|
| DE | 3509634 A1 * | 5/1986 |
| EP | 1443072 A1 * | 8/2004 |

OTHER PUBLICATIONS

Yoshida et al., "Optical Fibers with Polygonal Cladding", Optical Fiber Technology, vol. 3, pp. 273-277, Apr. 1997—hereinafter known as Yoshida.*

\* cited by examiner

*Primary Examiner* — Christina Johnson
*Assistant Examiner* — Lisa Herring
(74) *Attorney, Agent, or Firm* — Svetlana Z. Short

(57) ABSTRACT

A method and an apparatus for making an optical fiber preform comprising the steps of (i) depositing a plurality of rods are deposited into an inner cavity of an apparatus; (ii) depositing particulate glass material in the inner cavity between the rods and the inner wall; and (iii) applying pressure against the particulate glass material to pressurize the particulate glass material against the plurality of rods.

31 Claims, 18 Drawing Sheets

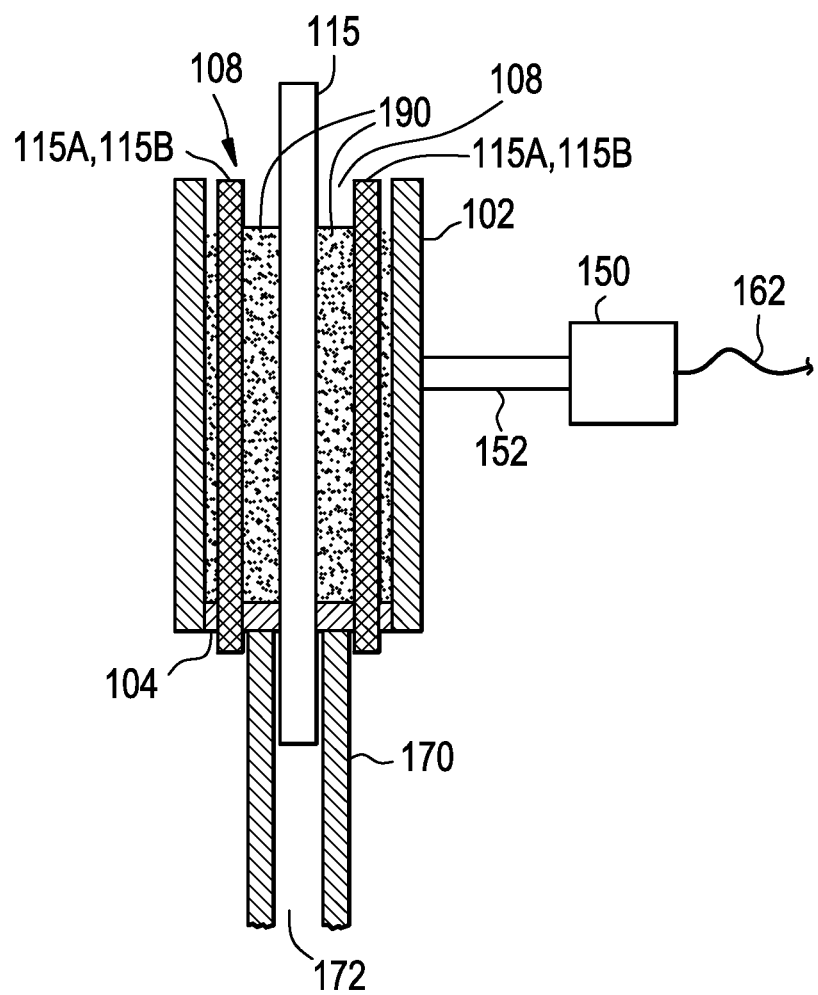

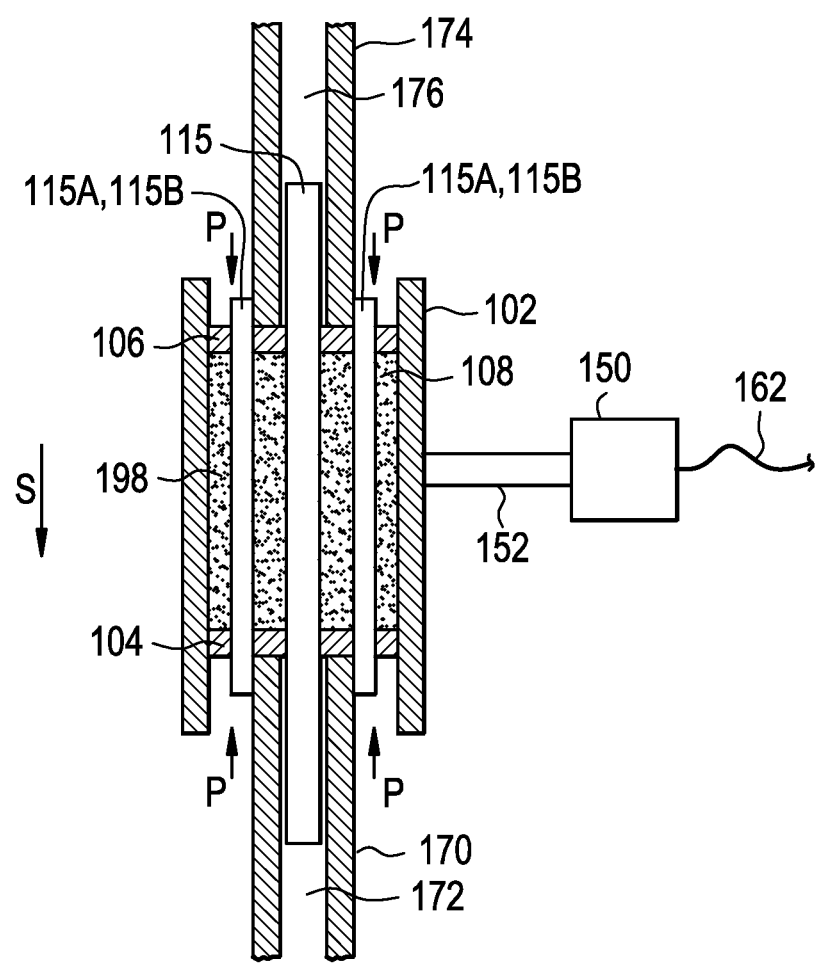

SOOT PRESSING FOR OPTICAL FIBER OVERCLADDING

This application claims the benefit of priority under 35 USC 119(e) of U.S. Provisional Application Ser. No. 61/266,311 filed Dec. 3, 2009.

BACKGROUND OF THE INVENTION

1. Field of the Invention

The present invention relates generally to methods and apparatus for making optical fibers with plurality of holes or stress rods that utilize soot pressing for optical fiber overcladding, and particularly to methods and apparatus for making optical fiber preforms.

2. Technical Background

Conventional chemical vapor deposition (CVD) processes, such as outside vapor deposition (OVD) and vapor axial deposition (VAD) processes, for making optical fiber preforms often utilize only a portion of the starting raw material due to limitations in the deposition efficiency of the OVD process. Use of the resulting "waste" silica soot could, therefore, potentially result in significant raw material cost savings.

Accordingly, different methods have been devised to utilize otherwise unutilized silica soot in the production of optical fiber preforms. These methods can suffer from a variety of drawbacks including expensive, complicated, and/or time consuming processing conditions and equipment, and may result in preforms with less than desirable properties such as unacceptable variability with respect to preform density and geometry.

There are a number of optical fiber applications where plurality of holes or stress rods are used in the cladding to achieve desirable optical properties. The applications include single polarization fiber, polarization maintaining fibers, bend insensitive fibers, photonic crystal fibers, high numerical aperture fibers, and endless single mode fibers.

Single polarization and polarization maintaining fibers typically include a central core and multiple air hole or boron doped stress rods (FIG. 1) situated within a cladding and near the fiber core. These fibers are often manufactured by an outside vapor deposition (OVD) process in which silica cladding glass is deposited on a glass core cane, for example, through the pyrolysis of octamethyltetrasiloxane. The OVD process is a highly optimized, high yield manufacturing process. However, the formation of the cladding layer is often the rate limiting step in maximizing optical fiber output. Further, it is estimated that as little as 50% of the pyrolysis product of the octamethyltetrasiloxane feedstock is deposited on the glass core canes during deposition of the cladding portion of the optical fiber preform. The silica cladding soot layer is then sintered to create a silica core/cladding glass blank. The single polarization and polarization maintaining fibers are usually manufactured by drilling/machining precise holes inside these core/cladding glass blanks and, and if stress rods are utilized, by inserting the stress rods into these holes. The resultant assembly may be inserted into a silica tube or overcladded, sintered, and then drawn into single polarization or polarization maintaining optical fibers. However, in order to obtain good optical performance, the dimensions of the drilled holes must be very precise and require a significant amount of post-processing, resulting in an increase in the processing cost of these fibers.

In another set of applications, a plurality of holes are present in the cladding. Such configurations are suitable for photonic crystal fibers or bend insensitive fiber application. These fibers are generally made using a stack and draw process or by drilling holes in the preform.

In order to further improve optical fiber output and reduce raw material costs and other manufacturing costs, alternative methods of manufacturing optical fibers with plurality of holes or stress rods in the cladding are desirable.

SUMMARY OF THE INVENTION

One aspect of the invention is a method for making an optical fiber preform. The method includes the steps of: (i) depositing a plurality of rods into a mold cavity of an apparatus; (ii) depositing particulate glass material in the mold cavity between the rods and the inner wall; and (iii) applying pressure against the particulate glass material to pressurize the particulate glass material against the plurality of rods.

In some embodiments the plurality of rods comprise: (i) at least one glass rod and at least one mold rod; or (ii) at least two glass rods. According to some embodiments, one or more of the glass rods is a core rod. According to some embodiments the plurality of glass rods are multiple core canes or multiple stress rods. Preferably the rods are aligned co-linearly with one another. According to some embodiments, preferably, the pressure is applied axially and/or radially. According to some embodiments, the pressure is applied from at least one side of the mold cavity. According to some embodiments the cross-section of the mold cavity is circular. According to some embodiments the cross-section of the mold cavity is circular does not have circular symmetry.

According to some embodiments, the apparatus comprises an outer wall and an inner wall, the outer wall surrounding the inner wall and the inner wall surrounding the inner cavity; and the pressure is applied at least radially inwards, and is 25 psig to 250 psig against the particulate glass material to pressurize the particulate glass material against the plurality of rods.

In other embodiments the pressure is applied axially. For example, silica glass soot may be pressurized in an axial direction to form a soot compact having a density of at least 0.5 g/cc around the glass core, more preferably at least 0.65 g/cc, and even more preferably to at least 0.75 g/cc (e.g., 0.75 g/cc to 1.2 g/cc or 0.8 g/cc to 1.1 g/cc).

In other embodiments the pressure is applied both axially and radially inwards, which may or may not be done simultaneously. For example, the pressure may be 25 psig to 250 psig against the particulate glass material to pressurize the particulate glass material density of at least 0.5 g/cc, preferably at least 0.65 g/cc, and more preferably to at least 0.75 g/cc (e.g., 0.75 g/cc to 1.2 g/cc or 0.8 g/cc to 1.1 g/cc).

In other embodiments the mold cavity has a rectangular cross-section and pressure is applied one or more side walls of the rectangular cavity, which may or may not be done simultaneously. For example, the pressure may be 25 psig to 250 psig against the particulate glass material to pressurize the particulate glass material to density of at least 0.5 g/cc, preferably at least 0.65 g/cc, and more preferably to at least 0.75 g/cc (e.g., 0.75 g/cc to 1.2 g/cc or 0.8 g/cc to 1.1 g/cc).

In another embodiment, the inner wall includes a rolled sheet with interdigitated fingers. Radially inward pressure is applied by pulling the interdigitated fingers in opposite directions in order to reduce the diameter of the rolled sheet.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 4 depicts schematically a cross section of a mold assembly and ultrasonic source loaded with uncompressed silica glass soot according to one or more embodiments shown and described herein;

FIG. 6 depicts schematically a cross section of a mold assembly and ultrasonic source being used to form a soot compact around a glass core cane according to one or more embodiments shown and described herein;

DETAILED DESCRIPTION OF THE PREFERRED EMBODIMENTS

Figure 1:
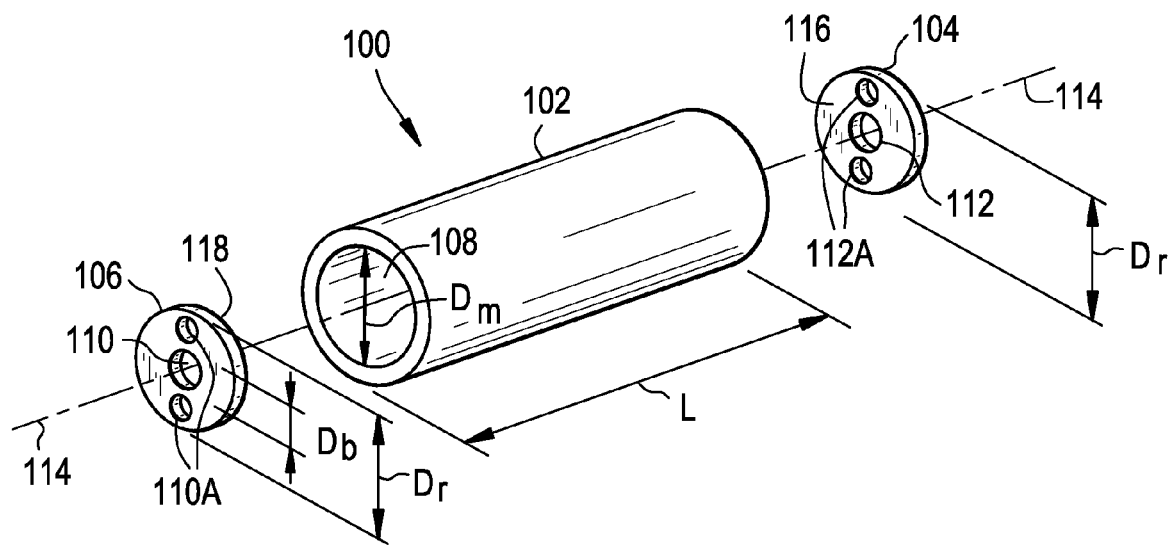
FIG. 1 is a schematic depiction of a mold assembly for forming optical fiber preforms according to one or more embodiments shown and described herein.

Reference will now be made in detail to the present preferred embodiments of the invention, examples of which are illustrated in the accompanying drawings. Whenever possible, the same reference numerals will be used throughout the drawings to refer to the same or like parts.

One embodiment of the present invention relates to methods and apparatus for making an optical fiber preform that include depositing and pressurizing particulate glass material, such as glass soot, around multiple rods. The multiple rods may be, for example, multiple mold rods and/or multiple glass rods. For example, the glass rods may include a core cane and at least one stress rod. In another exemplary embodiment For example, the glass rods may include multiple core canes. Preferably, the rods have circular cross-sections, but rods with other cress-sections may also be utilized. The rods may have the same sizes, or may be of different sizes. The exemplary methods and apparatus are suitable making optical fiber preforms and can be utilized for making optical fibers with a plurality of holes or stress rods in the cladding, and utilize soot pressing when manufacturing optical fiber. The examples of optical fiber embodiments that can be made using these exemplary manufacturing methods include: single polarization fibers, polarization maintaining fibers, bend insensitive fibers, multi-core fibers, multi-core fiber ribbons, and photonic crystal fibers.

By core cane what is meant is a consolidated glass rod which includes at least a portion of the core glass of an optical fiber which will eventually be drawn from a preform using the core cane. The core cane may include at least a portion of the cladding glass of an optical fiber which will eventually be drawn from a preform using the core cane. Alternatively, the core cane may be surrounded by a porous soot clad layer.

By stress rods what is meant is consolidated glass rod(s) with a different index of refraction and/or different thermal expansion coefficient (CTE) than that of the cladding glass. The stress rods are preferably situated off-center within the preform and may be, for example, boron doped silica (i.e., consolidated B doped silica rods) or silica co-doped with boron and fluorine. The stress rods may, for example, have an overcoat of pure silica, or may be situated inside a silica tube.

According to some embodiments, a method of forming a cladding portion of an optical fiber preform assembly includes positioning a glass core cane and additional glass rods (e.g., stress rods) in a mold cavity of a mold assembly. The particulate glass material, for example silica glass soot may be loaded into the mold cavity such that the glass core cane and the stress rod(s) are surrounded by particulate glass material such as silica glass soot. The particulate glass material such as silica glass soot in the mold cavity may be compressed in the axial direction and/or radial direction such that a soot compact is formed around the rods, for example around the glass core cane and the additional glass rods, such as stress rods. The pressed particulate glass material (e.g., soot compact) around the stress rods and/or core rod may have a density of at least 0.5 g/cc (i.e., 0.5 g/cm$^3$). For example, the density of the pressed (compressed) particulate glass material may be 0.6 g/cm$^3$, 0.7 g/cm$^3$, 0.75 g/cm$^3$, 0.8 g/cm$^3$, 0.9 g/cm$^3$, 1 g/cm$^3$, 1.1 g/cm$^3$, or 1.2 g/cm$^3$. The mold cavity can be designed to effect a desired geometry between the core cane, the glass rods (for example, stress rods), and the outer pressed soot form. The cross-sectional shape of the mold cavity may be circular, or elliptical, or other shape as required to achieve a specific geometric relationship between the different glass rods after consolidation to a blank, and after drawing the blank to optical fiber. The detailed shape may require empirical modification to compensate for non-isotropic shrinkage of the soot around the axially situated glass rods.

Alternatively, according to another embodiment of the present invention, the methods and apparatus for making an optical fiber preform that include depositing and pressurizing particulate glass material, such as glass soot, around (preferably cylindrical) mold rod(s) and, if the core cane is utilized, also around the core cane.

For example, one can utilize mold rods instead of stress rods to create air holes in the resultant preform. More specifically, the mold rods are removed from the pressed particulate glass or soot compact (which corresponds to the cladding portion of the preform), leaving the voids in the soot compact layer of the preform. The preform can be consolidated such that the voids remain therein, and the resultant soot preform can then be drawn into optical fiber. As described above, the silica glass soot in the mold cavity may be compressed in then axial direction and/or radial direction, such that a soot compact is formed around the mold rods (before they are removed) and/or around the glass core cane. The cross-sectional shape of the mold cavity may be circular, elliptical, or other shape as required to achieve a specific geometric relationship between the different glass rod and the mold rods elements after consolidation to a blank, and after drawing the blank to optical fiber.

According to another embodiment, the methods for making an optical fiber preform include depositing and pressurizing particulate glass material, such as glass soot, around a core cane and/or around the (preferably cylindrical) mold rod(s), as described above. The resulting body is partially sintered (pre-sintered) by treatment at temperatures between 700° C. and 1100° C. between 1 and 3 hours, which creates a porous soot perform strengthened by the formation of glass necks between the individual particles. After the pre-sintering step, the porous soot preform can be handled more easily. The pre-sintered preform can then be fully sintered to a glass fiber perform using methods well known in the art, or machined to a desired shape and subsequently sintered.

In addition, in this and other embodiments, a core mold rod, instead of the core cane may be placed, for example, at the center of the mold cavity. The additional mold rod(s) and/or glass rod(s) are also placed in the mold cavity, and the particulate glass is then pressurized (compressed) forming a pressed particulate glass (e.g., soot compact). The (core) mold rod is then removed and a core cane is then inserted into its place, before sintering.

Similarly, multiple mold rods may be utilized instead of multiple core canes, and the particulate glass is then compressed forming a the soot compact around the mold rods. The (core) mold rods are then removed and a core canes are then inserted into their place, before sintering.

In yet another embodiment, the method for making an optical fiber preform includes the steps of depositing and pressurizing particulate glass material, such as glass soot, around a core cane and a plurality of mold rods). That is, one can utilize mold rods instead of stress rods to create a plurality of air holes in the resultant preform. More specifically, the mold rods are removed from the pressed particulate glass (e.g., soot compact which corresponds to the cladding portion of the preform), leaving voids in the resulted pressed layer of the preform. The number of voids can be greater than 5, for example greater than 50, or greater than 100 and even greater than 200. The preform can be consolidated such that the plurality of voids remains therein, and the resultant soot preform can then be drawn to optical fiber that contains a region with a plurality of voids: for example, a low band loss fiber, or a photonic crystal fiber. As described above, the silica glass soot in the mold cavity may be compressed in the axial direction and/or the radial direction such that a soot compact is formed around the glass core cane and the mold rods. The void carrying region may comprise only part of the cladding. For example, the cladding may comprise an inner region with a plurality of voids, with the outer region being void free. In that case, additional glass/soot deposition step may be needed to make the rest of the cladding.

According to yet another embodiment of the present invention, the methods and apparatus for making an optical fiber preform that include (i) depositing and pressurizing particulate glass material, such as glass soot, around a core cane and (preferably cylindrical) mold rod(s); and (ii) upon removal of mold rods, situating another material in the resulting voids (holes. That is, as described above, one can utilize mold rods instead of stress rods to create air holes in the resultant preform. More specifically, the mold rods are removed from the pressed particulate glass or soot compact (which corresponds to the cladding portion of the preform), leaving voids or holes in the resulting pressed layer of the preform, and these holes are filled with another material.

In one example of this embodiment, these voids are then filled with a second particulate glass composition, such as a boron doped silica soot (e.g., in order to create boron doped stress rods). The preform assembly comprising core cane, boron doped soot and the pressed overclad material (soot compact) is sintered such that the overclad material and boron doped soot obtain complete densification. The resultant consolidated preform can then be drawn to produce an optical fiber.

In another example of this embodiment, in certain applications, the glass powder, such as boron-doped-soot (that will be used to fill the voids) may be too reactive with the glass soot to retain the desired stress effects after consolidation. To avoid reaction, a preform made with one or more voids can be filled with a silica tube that has thin walls, and the tube(s) itself are then filled with the glass powder (e.g., boron doped silica powder). The dense silica glass tube inhibits reaction between adjacent high surface area soot, and enables the boron doped soot powder to provide the desired physical attributes after preform consolidation.

In a third example of this embodiment the preform made with voids can be consolidated directly to glass, resulting in a consolidated glass blank with voids geometrically aligned relative to the core cane. The voids can be filled with a number of materials, including glass rods or powders, metallic rods, wire or powders, and semiconducting rods or powders. The blank filled with a second phase may be re-consolidated, re-drawn to a smaller diameter cane, or drawn to fiber.

The particulate glass material may be undoped silica, or the particulate glass material may be doped. Potential dopants include at least F, B, Ge, Er, Ti, Al, Li, K, Rb, Cs, Cl, Br, Na, Nd, Bi, Sb, Yb and combinations thereof. The particulate glass material may be left over spray soot or otherwise left over soot from a CVD process ("CVD waste soot"), such as left over soot from an OVD process ("OVD waste soot") or left over soot from a VAD process ("VAD waste soot"), or glass soot from any other silica source, such as sand, or mixtures of glass soots of different type, or mixtures of sand and glass soot.

The particulate glass material can be untreated (e.g., silica soot or CVD waste soot containing no additional coagulants or solvents) or may be treated with one or more coagulants or solvents, such as water or an organic solvent. In preferred embodiments, the particulate glass material is untreated. Preferably, the particulate glass material has an average tap density of from 0.1 to 1.0 grams per cubic centimeter, even more preferably of from 0.2 to 0.7 grams per cubic centimeter, such as from 0.3 to 0.5 grams per cubic centimeter, for example about 0.38 grams per cubic centimeter.

The mold rods may comprise a rigid, inelastic material such as carbon, Teflon, aluminum, steel, silicon aluminum oxynitride, silicon carbide or other, similar mechanically durable materials.

The boron doped silica preferably contains between 5 and 25% boron oxide, and more preferably between 15 and 22% boron oxide, to provide a stress field sufficient to be useful in polarization maintaining fiber designs. Preferably the boron doped silica powder has a tap density of between 0.4 and 1.0, preferably within 0.1 g/cc of the density of the final pressed silica soot body.

Metals that may be utilized for inclusion into voids of a consolidated preform and then drawn into a geometrically designed array around a central core cane may include Cu, Ag, Au, W and Ga. may be included into voids of a consolidated preform and then drawn into a geometrically designed array around a central core cane include materials such as, for example, $Si_3N_4$ and $Si_3N_4/SiC$.

Reference will now be made in detail to the various exemplary embodiment(s), examples of which are illustrated in the accompanying drawings. Whenever possible, the same reference numerals will be used throughout the drawings and description to refer to the same or like parts. One embodiment of the method of forming optical fiber preforms is depicted in FIG. 6. In the embodiment illustrated, a glass core cane, the glass rods and/or the mold rods are positioned in a cylindrical mold cavity and silica glass soot is loaded into the mold cavity. Vibratory energy and pressure are applied to the silica glass soot to compress the silica glass soot and form a densified soot compact surrounding the glass core cane and the other rods. The soot compact forms the cladding portion of an optical fiber preform assembly while the glass core cane forms the core portion of the optical fiber preform assembly. If there are glass rods situated off-center in the mold cavity, these glass rods may form the stress rod portion of the optical fiber preform assembly. Thereafter, the optical fiber preform assembly may be consolidated to form an optical fiber preform. Methods of forming optical fiber preform assemblies and the apparatus used to form optical fiber preform assemblies will be described in more detail herein.

Referring to FIG. 1, an exemplary mold assembly 100 for forming an optical fiber preform assembly comprises a mold body 102, a lower ram 104 and an upper ram 106. The mold body 102 defines a mold cavity 108 centered on and extending along the long axis 114 of the mold body 102. The mold cavity 108 may be cylindrical with a diameter $D_m$ and a length L. The mold body 102 may comprise a rigid, inelastic material such as carbon, aluminum, steel, silicon aluminum oxynitride, silicon carbide or other, similar mechanically durable materials. In one embodiment, the mold body 102 may be formed as a single piece, as shown in FIG. 1. It is noted that mold assemblies with non-circular cross-sections may also be utilized. For example, the mold cavity 108 may be rectangular or elliptical in cross-section.

Figure 2:
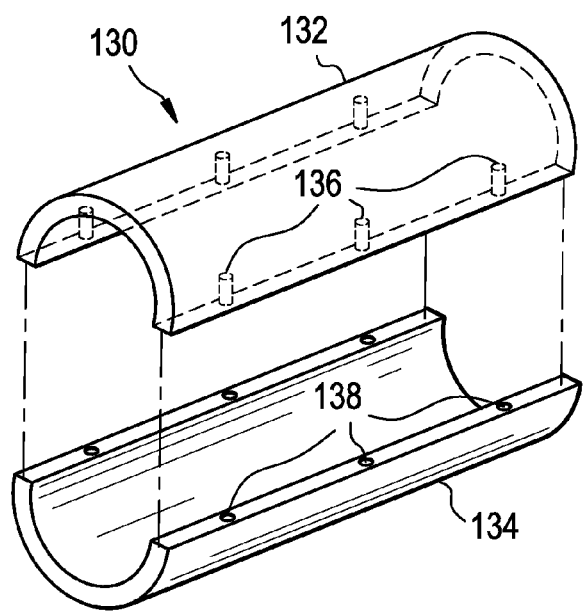
FIG. 2 depicts schematically a segmented mold body for forming optical fiber preforms according to one or more embodiments shown and described herein.

Referring now to FIG. 2, another embodiment of a mold body is shown. In this embodiment, the mold body is a segmented mold body 130 formed from a plurality of mold segments 132, 134 extending along an axial direction. In the embodiment shown, the mold segments 132, 134 may be fastened together by inserting fasteners through fastener holes 136 positioned along the edge of the mold segment 132 and into corresponding threaded holes 138 positioned along the edge of mold segment 134. However, it should be understood that the mold segments may be joined together using a variety of other fasteners and/or fastening techniques. For example, mold segment 132 may be coupled to mold segment 134 using one or more bands (not shown) which extend around the circumference of the assembled segments thereby securing mold segment 132 to mold segment 134.

According to one or more embodiments mold body mold body 102 defines a mold cavity 108 centered on and extending along the long axis 114 of the mold body 102 for a length L. The cross-sectional shape of the mold cavity 108 may be circular, or non-circular (for example, elliptical, hexagonal, irregular (e.g., D shaped) or other designed shape to obtain the desired ultimate geometry of the optical fiber. The mold cavity 108 may be formed in either a single part or may have a segmented configuration.

Still referring to FIG. 2, the segmented mold body 130 may be lined with a material (not shown) such that the interior surface of the segmented mold body 130 is substantially continuous. In one embodiment, the lining material may comprise a low-friction polymeric material such as polytetrafluoroethylene (PTFE) or a similar material. In another embodiment, the lining material may comprise non-polymeric low friction materials such as carbon sheet or similar materials. The lining material may comprise a sheet of lining material positioned against the wall of the mold cavity 108 or a coating applied to the mold cavity 108. The lining may also correspond to the material for the inner wall of the mold cavity that is described later on in the specification, to enable application of the radial pressure to a partially compressed preform. This lining material can be made of any material that has sufficient elasticity and yield strength to sufficiently elastically deform radially inwardly without suffering plastic deformation when subjected to the maximum normal operating pressures in the cavity, for example a tube made of a latex material. However, the lining material may correspond to the inner wall, which will be discussed further in detail herein. The inner wall forms walls of the inner cavity (mold cavity) of the mold assembly 100. Such mold cavity may provide for both radial and axial pressure applications using the same mold assembly 100.

It should be understood that, while FIG. 2 depicts the segmented mold body 130 as comprising two mold segments 132, 134, the segmented mold body 130 may comprise three or more mold segments which, when joined together, generally define a cylindrical mold cavity.

The diameter $D_m$ of the mold cavity 108 and the length L of the mold cavity 108 are generally selected to arrive at the desired final dimensions of the fully consolidated optical fiber preform made according to the soot pressing method described herein. For experimental purposes (e.g., to form a laboratory scale optical fiber preform) mold cavities with diameters of 44 mm, 48 mm, and 89 mm and a length of 61 cm were used to form laboratory scale optical fiber preforms having outer diameters after consolidation from about 3.3 cm (using a 44 mm diameter mold cavity) to less than about 7 cm (using an 89 mm diameter mold cavity). However, it should be understood that dimensions of the mold body 102 and the mold cavity 108 may be upwardly scaled to produce larger optical fiber preforms for use in the commercial production of optical fiber. For example, to produce a larger, production ready optical fiber preform, the diameter of the mold cavity 108 of the mold body 102 may be on the order of 20 cm which may yield an optical fiber preform having an outer diameter on the order of 15 cm following consolidation. Further, the length of the mold cavity may be on the order of 2 m or greater. Criteria for selecting the diameter of the mold cavity to achieve the desired optical fiber preform dimensions will be discussed further herein.

Referring again to FIG. 1, the lower ram 104 and upper ram 106 are generally disc-shaped and have an outer diameter $D_r$. The outer diameter $D_r$ of the rams 104, 106 may be substantially the same as the diameter $D_m$ of the mold cavity 108 such that the rams 104, 106 may be positioned in the mold cavity 108 and slidably positioned relative to one another along the long axis 114 of the mold body 102. The rams 104, 106 may be made of metal, such as aluminum or steel, or plastic or any other material having suitable durability. Each of the lower ram 104 and upper ram 106 may comprise a (core) bore 112, 110, respectively, extending through the center of the ram such that, when the rams 104, 106 are positioned in the mold cavity 108, the bores 112, 110 are centered on the long axis 114 of the mold body 102. Each bore 112, 110 may have a diameter $D_b$ which generally corresponds to the diameter of a glass core cane 115 used for making the optical fiber preform assembly, which will be described in further detail herein. Each of the lower ram 104 and upper ram 106 may also comprise one or more bore(s) 112A, 110A, respectively, extending through the rams such that, when the rams 104, 106 are positioned in the mold cavity 108, the bores 112A, 110A are situated off-axis with respect to the long axis 114 of the mold body 102. Each bore 112A, 110A may have a diameter $D'_b$ which generally corresponds to ether the diameter of a stress rod 115A or a mold rod 115B used for making the optical fiber preform assembly, which will be described in further detail herein. However, in some alternative embodiments, the bores 112, 110, and/or 112A, 110A do not have a circular cross-section. In these alternative embodiments the dimension and shapes of the bores 112A, 110A are preferably the same as the dimensions and shapes of the bore(s) 112A, 110A. For example, oval bores may allow the stress rods and/or mold rods to move under applied pressure, if such movement is desirable (for example, if both radial and axial pressure is applied to the particulate glass. In addition, in some embodiments, the stress rods or mold rods may not have a circular cross-section.

As shown in FIG. 1, the rams 104, 106 each comprise an interior surface 116, 118, respectively. The interior surfaces 116, 118 are opposed to one another when the rams 104, 106 are positioned in the mold cavity 108. In the embodiment shown in FIG. 1, the interior surfaces 116, 118 of the rams 104, 106 are generally planar. However, it should be understood that the interior surfaces 116, 118 of the rams 104, 106 may comprise other surface geometries. For example, the interior surfaces 116, 118 of the rams 104, 106 may be conically tapered or parabolically shaped in order to shape the end portions of the soot compact formed by compressing silica glass soot between the rams 104, 106 in the mold cavity 108 to improve the shape retention of the soot compact upon sintering. Moreover, the interior surfaces 116, 118 of the rams 104, 106 may have a parabolic geometry to optimize reflection and/or dissipation of vibratory energy introduced into the mold cavity 108 through the mold body 102.

Figure 3:
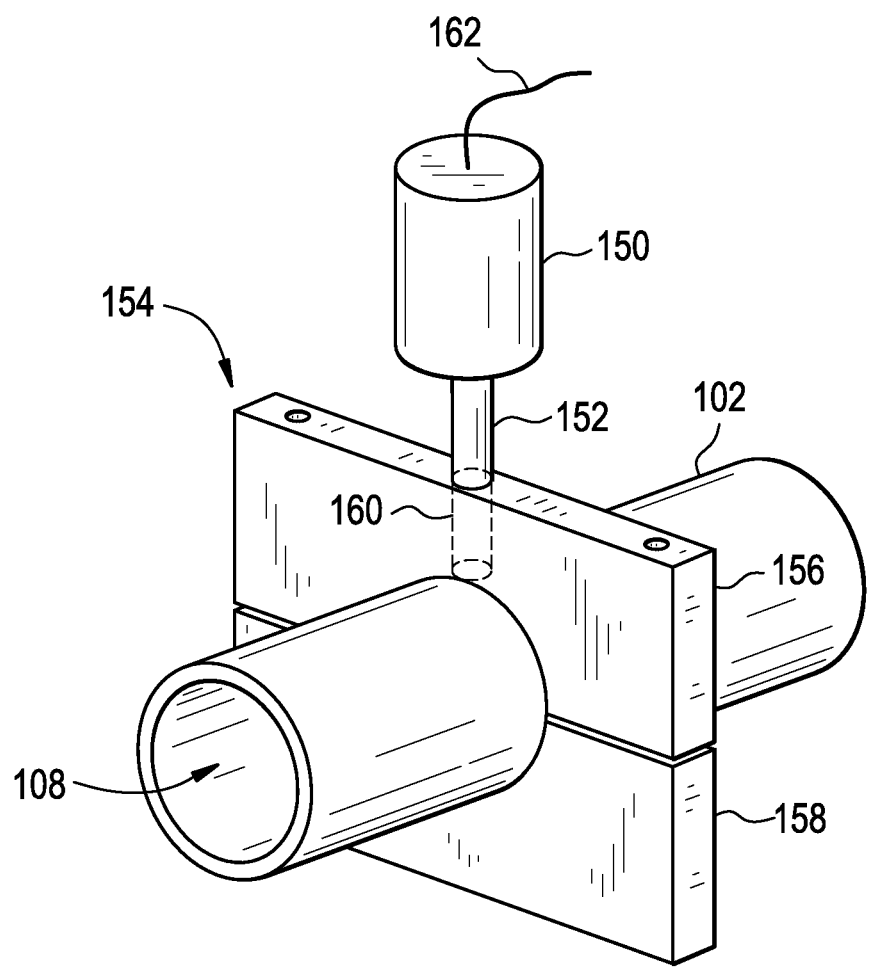
FIG. 3 depicts schematically a mold assembly coupled to an ultrasonic source according to one or more embodiments shown and described herein.

Referring now to FIG. 3, a mold body 102 of the mold assembly 100 is shown coupled to an ultrasonic source 150. The ultrasonic source 150 may be used to apply vibratory energy to the mold body 102 which is, in turn, propagated into the mold cavity 108. The vibratory energy fluidizes silica glass soot loaded in the mold cavity 108 thereby reducing drag or friction between adjacent silica glass soot particles and friction between silica glass soot particles and the interior of the mold which, in turn, facilitates compressing silica glass soot to a greater and more uniform density along the length L of the mold than without the application of vibratory energy. The greater and more uniform density of soot compacts produced by applying vibratory energy during formation of the soot compact (situated around the glass core cane and the stress rod(s) and/or mold rod(s)) produce an optical fiber preform assembly which, when consolidated into an optical fiber preform, has very little taper from the ends of the preform to the center of the preform. That is, the density of the glass formed from the soot compact is substantially uniform along the axial length of the optical fiber preform. It should be understood that the phrase "optical fiber preform assembly," as used herein, refers to a soot compact with a plurality of rods and/or holes which, when consolidated, forms an optical fiber preform that includes at least: (i) glass rods such as stress rods, and/or holes left after the removal of mold rods; and (ii) a glass cladding portion corresponding to the soot compact. Typically, the optical fiber preform assembly will also include a glass core cane imbedded in a soot compact, which, when consolidated, forms the core portion of the preform It is noted that in some embodiments, instead of core cane, a centrally located mold rod can be inserted into the center of the cavity. After the compression is completed, prior to sintering, the mold rod is removed and a core cane 115 is inserted into the void left by the mold rod.

The ultrasonic source 150 is coupled to the mold body 102 with a waveguide 152 and mounting collar 154. In the embodiment shown, the mounting collar 154 comprises a first collar portion 156 and a corresponding second collar portion 158. The first collar portion 156 and the second collar portion 158 may be positioned around the mold body 102 and fastened together such that the mounting collar 154 is securely attached to the mold body 102. The first collar portion 156 may comprise a channel 160 extending through the first collar portion 156. The waveguide 152 may be positioned in the channel 160, such that the waveguide 152 is positioned proximate to the mold body 102 but not in direct contact with the mold body 102. The ultrasonic source 150 is coupled to the end of the waveguide 152 opposite the mold body 102 such that vibratory energy generated by the ultrasonic source 150 may be propagated along the waveguide 152, into the mounting collar 154 and, thereafter, to the mold body 102.

The ultrasonic source 150 may be coupled to a control unit (not shown) via electrical cable 162. The control unit may comprise a signal generator and a 5 kW power amplifier. The signal generator may be operable to produce various low voltage (e.g., 5-10 volts) electronic waveforms which are amplified by the power amplifier before the control unit passes the electronic waveforms to the ultrasonic source 150 via the electrical cable 162. A transducer in the ultrasonic source 150 converts the electronic waveforms to vibratory energy which is propagated along the waveguide 152 to the mold body 102 thereby mechanically vibrating the mold body 102 and the contents of the mold cavity 108. The electronic waveforms generated by the signal generator and passed to the ultrasonic source 150 may take on a variety of forms including, without limitation, sinusoidal waveforms, square wave waveforms, sawtooth waveforms, triangular waveforms and the like. In one embodiment, the ultrasonic source 150 may receive electronic waveforms from the control unit and, based on the received electronic waveforms, generate high frequency vibrations having a frequency from about 15 kHz to about 50 kHz (e.g., a range of frequencies spanning from acoustic or audible frequencies to ultrasonic frequencies) and, more preferably, from about 17 kHz to about 25 kHz. In another embodiment, the ultrasonic source 150 may be operated to generate high frequency/low amplitude vibrations in the audible or acoustic range from about 1 kHz to about 15 kHz (e.g., outside the ultrasonic range) and, more preferably, from about 1 kHz to about 5 kHz. The intensity or amplitude of the vibratory energy generated by the ultrasonic source 150 may be controlled by adjusting the amplitude or intensity (e.g., the power) of the electronic waveforms generated by the control unit. In one embodiment, the control unit may be operated to generate electronic waveforms having multiple frequency modes and sweep such modes over a range of frequencies to avoid establishing a standing wave in the mold cavity. The control unit may also be operable to periodically vary the amplitude of the generated electronic waveforms. In another embodiment, the control unit may be operable to periodically apply a multimode frequency sweep to the generated electronic waveforms to avoid establishing a standing wave of vibratory energy in the mold cavity 108 which may inhibit compaction of silica glass soot loaded in the mold cavity. In one embodiment, the power of the power supply used to produce the electronic waveforms generated by the control unit may be from about 50% to about 60% of the 5 kW power supply while the frequency sweeping may be performed over a +/−30 Hz frequency range.

Referring now to FIG. 4, a cross section of a mold body 102 is shown. In this embodiment, in order to form an optical fiber preform assembly, first, a glass core cane 115 (or alternatively a core mold rod), and the glass stress rod(s) 115A and/or mold rod(s) 115B are positioned in the mold cavity 108, and then silica glass soot 190 is loaded around the core cane (or core mold rod) and one or more rods (i.e., mold rod(s)) and/or stress rod(s)), and compressed or pressed. The desired dimensions of the fully consolidated optical fiber preform govern the exact dimensions of the mold cavity and the final density of the soot compact created by the pressing operation. For typical exemplary laboratory scale optical fiber preforms, with a single core rod in the center, the exemplary desired core/clad ratio of the preform is 0.069 meaning that the core portion of the optical fiber preform is 6.9% of the preform diameter. Thus, if we have a glass core cane having a 19 mm diameter and the core diameter is 23% of the cane diameter or 4.18 mm, the outside diameter of the fiber preform after consolidation should be about 61 mm, in order to achieve the desired core/clad ratio of 0.069. The size of the mold needed to achieve an optical fiber preform of the desired dimensions may be thus determined by using the shrinkage rates for a given density of compacted silica glass soot. Shrinkage rates may need to be empirically determined for a given application, since the presence of non-compacting axial rods can cause anisotropic shrinkage of the soot. For example, an exemplary 89 mm diameter silica glass soot compact having a density of 0.81 g/cc, and surrounding a central 19 mm glass core cane rod has an axial shrinkage of about 21% and a radial shrinkage of about 32%, after consolidation to glass. Accordingly, to achieve a consolidated optical fiber preform having an outer diameter of 61 mm, the diameter of the mold cavity must be about 89 mm. Generally, to determine the necessary mold diameter to achieve a desired optical fiber preform geometry requires the following: the compacted soot density; experimentally derived values for axial; and radial shrinkage upon consolidation for a given soot density and the core/clad ratio of the glass core cane.

In order to form an optical fiber preform assembly comprising a glass core cane 115 surrounded by and coaxial with a soot compact cladding portion, a glass core cane 115, one or more stress rods 115A, and/or one or more mold rods 115B may be positioned in the mold cavity 108. More specifically, according to some embodiments, the glass core cane 115 is positioned in the bore of the lower ram 104 such that the glass core cane 115 is substantially centered on the long axis of the mold body 102. The glass stress rod(s) 115A and/or mold rod(s) 115B are positioned in the bore of the lower ram 104 such that they are located off-center with respect to the long axis of the mold body 102. The glass core cane 115 may comprise a cylindrical silica glass-based core cane comprising at least a pure silica glass core or doped silica glass core. The glass core cane may also comprise additional glass layers surrounding the core, such as an inner cladding layer or the like, and such additional layers may include dopants such that the glass layers have an index of refraction different than that of the glass core. The glass stress rod(s) 115A may comprise a boron-doped silica glass and may be cylindrical.

As shown in FIG. 4, the glass core cane 115, stress rod(s) 115A, and/or mold rod(s) 115B, and/additional core canes 115 may extend through the lower ram 104 and into a guide channel of lower ram extension 170. The lower ram extension 170 and upper ram extension 174 (shown in FIG. 6 and discussed further herein) transmit pressure from a press arm (not shown) of a press (not shown) to the rams 104, 106 thereby driving the rams 104, 106 towards one another along the axial direction of the mold body 102.

After the glass core cane 115, stress rod(s) 115A, and/or mold rod(s) 115B or additional core canes 115 are positioned in the mold cavity 108, the mold cavity 108 is loaded with particulate glass material, for example, silica glass soot 190. The silica glass soot 190 may comprise commercially available silica glass soot or silica glass particles. Alternatively, the silica glass soot may be soot recovered from pyrolysis of a chemical vapor depositions operation, e.g., from deposition of octamethyltetrasiloxane during outside vapor deposition (OVD) of an overclad portion of an optical fiber of other silica-based optical fiber preforms (e.g., silica glass soot recycled from an optical fiber preform manufacturing operation). The silica soot may comprise dopants, such as dopants which increase or decrease the index of refraction of silica glass, or the soot may be substantially pure silica glass soot. In one embodiment, the silica glass soot loaded into the mold cavity does not contain any binders. In one embodiment, silica glass soot may have a surface area between about 250 $m^2/g$ and about 5 $m^2/g$, more preferably from about 100 $m^2/g$ to about 10 $m^2/g$ and, most preferably, 50 $m^2/g$ to 10 $m^2/g$. These ranges generally correspond to particle sizes of about 10 nm to about 500 nm, more preferably 30 nm to about 250 nm and most preferably 60 nm to about 250 nm, respectively.

The amount of silica glass soot 190 loaded into the mold cavity 108 is dependent on the diameter of the mold cavity 108, the size of the stress rods 115A, or the core canes 115, or the mold rods 115B, the desired length of the consolidated optical fiber preform, and the desired core/clad ratio for the consolidated optical fiber preform. Based on these considerations, the amount of silica glass soot 190 added to the cavity is selected such that the target soot density for a soot compact 198 used to form the cladding portion of an optical fiber preform may be from about 0.5 g/cc to about 1.2 g/cc, more preferably greater than about 0.7 g/cc and less than about 1.1 g/cc, and most preferably greater than about 0.8 g/cc and less than about 1.0 g/cc.

In one embodiment, as shown in FIG. 4, the silica glass soot 190 is loaded into the mold cavity 108 in a single step. In this embodiment, as the silica glass soot 190 is loaded into the mold cavity 108, the silica glass soot may be stirred with slack in the glass core cane 115 to evenly distribute the soot in the mold cavity 108. Additionally or alternatively, the mold body 102 may be tapped and/or vibrated with the ultrasonic source as the silica glass soot is loaded into the mold cavity 108 to encourage uniform packing of the silica glass soot in the mold cavity 108. For example, vibratory energy may be applied to the mold cavity with the ultrasonic source 150 thereby fluidizing the silica glass soot and reducing friction between adjacent silica glass soot particles and reducing friction between silica glass soot particles and the interior surfaces of the mold cavity. When the silica glass soot is fluidized by the application of vibratory energy, the density of the silica glass soot loaded in the cavity may be increased without the application of mechanical pressure. Furthermore, the application of vibratory energy promotes uniformity in the density of the silica glass soot over the length of the mold body 102. In one embodiment, when vibratory energy is applied to the mold body 102 as the silica glass soot is loaded into the mold cavity, the silica glass soot may reach a density of at least about 0.35 g/cc and, more preferably, greater than about 0.37 g/cc without mechanically pressing the silica glass soot.

In another embodiment, silica glass soot may be loaded into the mold cavity 108 as a vacuum is drawn on the mold. For example, in one embodiment, a vacuum system (not shown) may be coupled to the mold cavity 108 proximate to the lower ram 104. This may be accomplished by positioning the mold body 102 in a vacuum base (not shown) operatively coupled to a vacuum system such that the mold cavity is fluidly coupled to the vacuum system. As silica glass soot is loaded in the mold cavity 108, the vacuum system is used to extract air (including moisture in the air) from the mold cavity 108 and silica glass soot which, in turn, increases the density of the silica glass soot prior to compaction. In another embodiment, such as when the mold body 102 is constructed of a porous material, a vacuum may be drawn outside the mold body 102 thereby drawing air and/or moisture through the mold body 102 as soot is loaded into the mold cavity 108. Vacuum assisted loading of silica soot may be performed in conjunction with the application of vibratory energy.

Figure 5A:
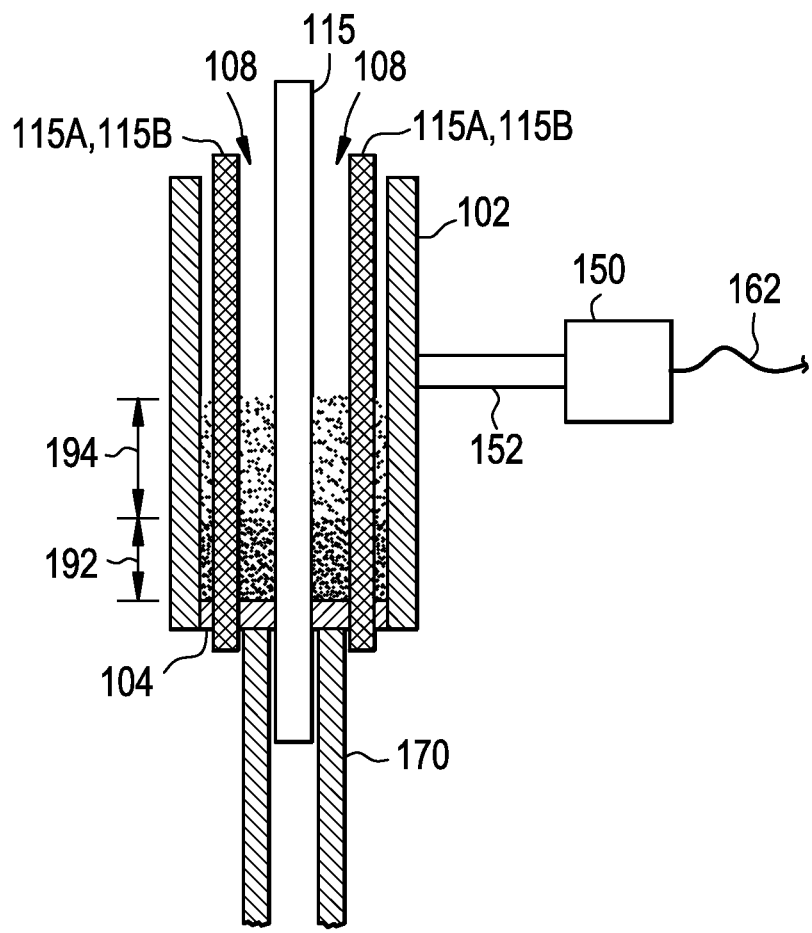
FIGS. 5A and 5B depict schematically a cross section of a mold assembly and ultrasonic source being loaded with silica glass soot according to one or more embodiments shown and described herein.
Figure 5B:
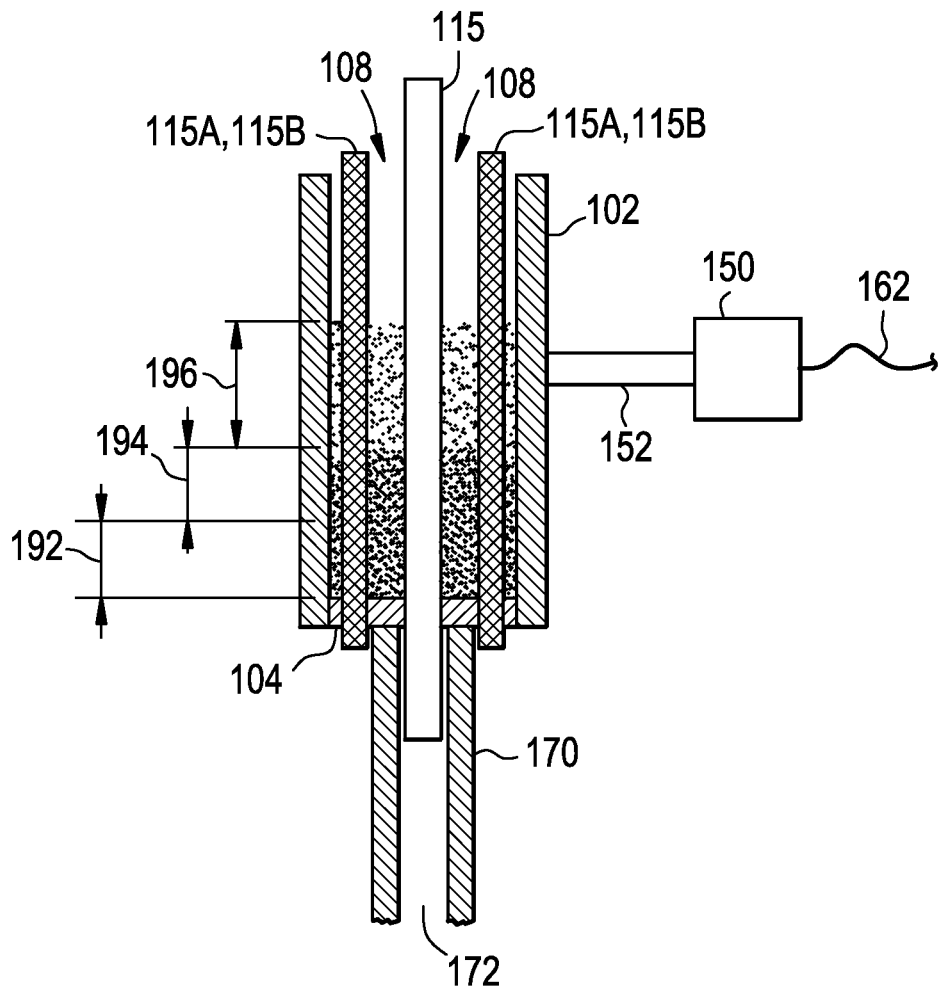

Referring now to FIGS. 5A-B, in another embodiment, the silica glass soot is loaded into the mold cavity 108 in discrete portions and each portion of silica glass soot may be compressed before a subsequent portion of silica glass soot is added to the mold cavity 108 in order to improve uniformity in the density of the silica glass soot along the length of the mold body 102. For example, referring to FIG. 5A, the mold cavity 108 is shown loaded with two portions of silica glass soot 192, 194. The first portion of silica glass soot 192 has been compressed prior to the addition of the second portion 194 such that the first portion has a greater density than the second portion 194, as is graphically illustrated in FIG. 5A. The second portion of silica glass soot 194 may be compressed after being loaded into the mold cavity 108 on top of the first portion of silica glass soot 192.

In one embodiment, compressing each portion of particulate glass material (in this embodiment silica glass soot) loaded into the mold cavity may include manually compressing the particulate glass material. Manually compressing the silica glass soot may comprise using a tamp or similar instrument to apply pressure to the silica glass soot thereby compressing the silica glass soot. Manually compressing the silica glass soot may also comprise positioning the upper ram 106 in the mold cavity and manually applying pressure to the upper ram 106 with an extension, such as the upper ram extension (shown in FIG. 6), thereby compressing the silica glass soot.

In another embodiment, compressing each portion of the particulate glass material (such as silica glass soot, for example) may comprise positioning the upper ram 106 in the mold cavity 108 such that the upper ram 106 is disposed over the portion of silica glass soot to be compressed. Thereafter, mechanical pressure may be applied to the upper ram 106 with a press, such as a hydraulic press or mechanical press, thereby compressing the particulate glass material (e.g., silica glass soot).

In order to maximize the density of each portion of silica glass soot, vibratory energy may be applied to the mold body 102 with the ultrasonic source 150 as each portion of silica glass soot is loaded into the mold cavity 108. Similarly, vibratory energy may also be applied to the mold body 102 as each portion of silica glass soot is compressed.

Referring to FIG. 5B, after the second portion of silica glass soot 194 has been compressed, as shown in FIG. 5B, a third portion (and optionally a fourth, fifth, and so on) of silica glass soot may be added to the mold cavity 108 directly adjacent to the second, compressed portion of silica glass soot 194. The third portion 196 may then be compressed and the loading/compressing process repeated until the desired amount of silica glass soot is loaded into the mold cavity 108.

Referring now to FIG. 6, after the mold cavity 108 is loaded with the desired amount of particulate glass material such as silica glass soot, the particulate glass material (e.g., silica glass soot) is axially compressed to form a soot compact 198 around the glass core cane 115, stress rods(s) 115A and/or mold rods 115B. To axially compress the silica glass soot, the upper ram 106 may be positioned in the mold cavity 108 such that the glass core cane 115, stress rods(s) 115A and/or mold rods 115B are inserted through the bore of the upper ram 106, and the upper ram 106 is in direct contact with the loaded silica particulate glass material (e.g., glass soot). The mold assembly may then be positioned in a press and the upper ram extension 174, which may be coupled to the press arm (not shown) of the press, is positioned against the upper ram 106 such that the glass core cane 115, stress rods(s) 115A and/or mold rods 115B is disposed in the respective guide channel 176, 176A and/or 176B of the upper ram extension 174 (and/or ram 106). In one embodiment, the lower ram extension 170 may be positioned on a support plate (not shown) of the press. In another embodiment the lower ram extension may contain a guide channel 172 and may be positioned on a second press arm (not shown).

In one embodiment, after the mold assembly 100 is positioned in the press, the ultrasonic source 150 may be used to apply vibratory energy to the mold body 102 before axial pressure is applied to the rams 104, 106. The vibratory energy may be applied to the mold body throughout the pressing operation in order to increase the density of the compressed silica glass soot during the pressing operation and to improve uniformity in the density of the resulting soot compact. It has been found that, when vibratory energy is applied to the mold body 102 during the soot pressing process, less pressure is needed to achieve the same or greater densities of compacted soot than in soot pressing operations where no vibratory energy is applied to the mold body 102.

In another embodiment, when a segmented mold is used in conjunction with a low friction (relative to silica glass soot) lining material, no vibratory energy needs be applied to the mold body 102 during the soot compaction process to reach the same amount of compaction as achieved with a solid, unlined mold body. This is because the friction between the silica glass soot particles and the lining material is sufficiently low that the silica glass soot adjacent to the lining material of the mold cavity 108 is easily compressed (e.g., the silica glass soot does not drag on the mold wall) thereby reducing or eliminating the need for vibratory energy to cause the fluidization of the silica glass soot along the mold wall.

In yet another embodiment, a vacuum system may be used to purge the mold of air during the pressing operation thereby eliminating air in the soot compact and reducing the overall compression time needed to obtain a soot compact of the desired density.

With the mold assembly positioned in the press, pressure P is applied to the upper ram 106 and the lower ram 104 with the press via the ram extensions 170, 174 such that the silica glass soot is compressed between the rams 104, 106. In one embodiment, the press is used to apply pressure to the upper ram 106 thereby advancing the upper ram 106 toward the lower ram 104. The upper ram 106 may be advanced at a rate of about 0.1 mm/sec to about 10 mm/sec and, more preferably 0.1 mm/sec to about 2.0 mm/sec. During the pressing operation, the mold body 102 is supported and allowed to slide in the axial direction (indicated by arrow S in FIG. 6) at a rate of about ½ the rate at which the upper ram 106 is advanced so that both the top and the bottom rams move toward the middle of the mold. Allowing the mold body to slide maintains the symmetry of the compaction forces around the center of the soot compact 198 and, when vibratory energy is being applied, keeps the ultrasonic source positioned at the center portion of the soot compact 198 throughout the pressing operation.

In one embodiment, the axial position of each ram 104, 106 relative to the mold body 102 is monitored as the silica glass soot is compressed. Measuring the axial position of each ram 104 may be accomplished by placing a sensor (not shown), such as an ultrasonic sensor, a proximity sensor, an optical sensor, or the like, on a fixed point above and/or below the mold body 102 and using the sensor to measure the distance between the sensor and the ram as the ram is advanced along the axis of the mold body 102. In another embodiment, the axial position of the rams in the mold body 102 may be directly measured such as by Vernier calipers or similar measurement devices (not shown) operatively coupled to the rams and/or mold body 102. The use of sensors or measurement devices to detect the position of the rams in the mold cavity enables a real time calculation of the average density of the pressed silica glass soot based on the position of the rams in the mold cavity, the dimensions of the mold cavity, the dimensions of the rams, and the mass of silica glass soot placed in the mold cavity 108. The real time measurement of soot density may be used as a process control variable for the soot pressing process. More specifically, when the silica glass soot is compressed to a target density, as determined from the real time measurements, no additional mechanical pressure may be applied to the rams 104, 106.

In another embodiment, when the press is a hydraulically actuated press, the hydraulic line pressure of the hydraulic press is monitored and used to control the soot pressing process. The pressure in the hydraulic lines of the press is indicative of the resistance experienced by the hydraulic press arm as the silica glass soot is compressed. Accordingly, as the density of the soot increases through compression, the pressure in the hydraulic lines also increases. Thus, for given mold dimensions and mass of silica glass soot loaded into the mold cavity 108, the hydraulic line pressure may be indicative of the density of the soot during soot pressing process. Accordingly, the hydraulic line pressure may be used to determine when the compressed soot has reached a target density.

While either the real time measurement of soot density or the hydraulic line pressure may be used as a process control variable for the soot pressing process, it should be understood that both may be used in order to determine the density of the soot during the soot pressing process.

In another embodiment, a load cell may be attached to the lower ram 104 to measure the actual compaction force applied to the silica glass soot disposed in the mold cavity. Data derived from the load cell, the axial displacement of the rams in the mold cavity, the mass of the suit, and the mold dimensions may be used to assure proper operation of the system and uniformity in the density of the resulting soot compact and, as such, may be used for quality control purposes.

As described hereinabove, the silica glass soot is pressed until a target soot density is reached for the resulting soot compact 198. The target soot density for a soot compact 198 used to form the cladding portion of an optical fiber preform may be from about 0.5 g/cc to about 1.2 g/cc, more preferably greater than about 0.7 g/cc and less than about 1.1 g/cc, and most preferably greater than about 0.8 g/cc and less than about 1.0 g/cc. In one embodiment, as the target soot density is approached, the application of vibratory energy is discontinued. For example, the application of vibratory energy may be discontinued when the calculated density of the soot compact is within 0.01 g/cc of the target density. Once the target density is reached, the pressure exerted on the rams at the target density is maintained as a static load for a predetermined relaxation time period to allow the soot compact to relax under the pressure. In one embodiment, the relaxation time period is from about 1 minute to about 10 minutes.

Figure 7:
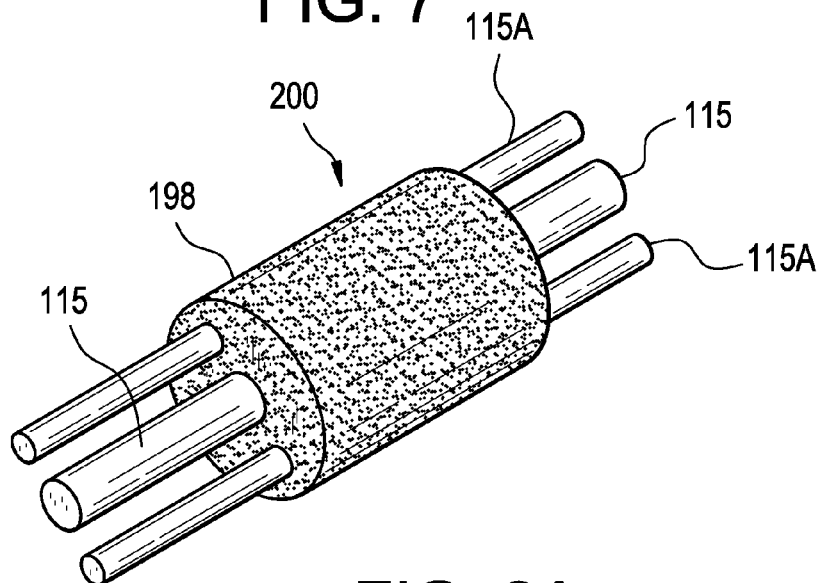
FIG. 7 depicts schematically an optical fiber preform assembly comprising a soot compact formed around a glass core cane according to one or more embodiments shown and described herein.

Following the relaxation period, pressure on the soot compact 198 is released and the upper ram 106 and the lower ram 104 are removed from the mold cavity 108 leaving the soot compact 198 with embedded glass core cane 115 and embedded stress rods 115A (and/or mold rods 115B) in the mold cavity 108. As shown in FIG. 7, the soot compact 198 and embedded glass core cane 115 and stress rods 115A form an optical fiber preform assembly 200. The soot compact 198 forms the cladding portion of the optical fiber preform assembly 200. The glass core cane 115 forms the core portion of the optical fiber preform assembly 200, and the stress rods 115A form the portion of the optical fiber preform assembly 200 that corresponds to the stress-inducing regions of the polarization maintaining or the single polarization fiber(s).

It is noted that instead of stress rods 115A, additional core canes 115 may be utilized. In this case, the multiple glass core canes correspond to the multiple cores of the resulting optical fibers. According to at least some embodiments the core canes are arranged co-linearly within the mold, and are situated collinearly (e.g., along the same diameter) within the pressed soot preform.

In order to further process the optical fiber preform assembly into an optical fiber preform, the optical fiber preform assembly 200 must be removed from the mold cavity 108. In one embodiment, to remove the optical fiber preform assembly from the mold cavity 108, the mold assembly is removed from the press and positioned on an extension rod such that the long axis of the mold body 102 is substantially vertical. Vibratory energy is then applied to the mold body 102 and the mold body is pressed off from the soot compact 198 leaving the optical fiber preform assembly positioned on the extension rod. According to some exemplary embodiments, if the mold rods 115B are utilized instead of stress rods 115A, after removal of the mold rods, the optical preform assembly 200 will include holes (voids 115B') instead of stress rods 115A. In some embodiments, a plurality of voids are formed in the cladding using a plurality of mold rods. The number of these voids in these embodiments is preferably greater than 5, more preferably greater than 50, more preferably greater than 100, and most preferably greater than 200. Optical fibers with a number of voids greater than 5 can be used, for example, as bend insensitive fibers, photonic crystal fibers, high numerical aperture fibers, or in endless single moded applications. In yet other embodiments, the plurality of voids comprise only a part of the cladding, with the rest of the cladding being void free.

In another embodiment, when a segmented mold is used to form the soot compact 198, the individual segments of the mold body are removed from around the optical fiber preform assembly until the optical fiber preform assembly can be removed from the mold cavity 108. In this embodiment, after the optical fiber preform assembly is removed from the mold cavity 108, the cylindrical sleeve surrounding the soot compact 198 is removed from around the soot compact 198 so that the optical fiber preform assembly can be further processed.

In yet another embodiment, the optical fiber preform assembly 200 may be removed from the mold cavity 108 by pre-sintering the soot compact 198 of the optical fiber preform assembly. Pre-sintering reduces the size of the soot compact such that the soot compact 198 may be easily removed from the mold cavity 108. Pre-sintering also increases the mechanical durability of the soot compact prior to consolidation and improves adhesion between the partially sintered soot compact and stress rods. If mold rods 115B are utilized to create holes in the optical fiber preform assembly 200, the mold rods 115B should preferably be removed from the soot compact before the pre-sintering step develops adhesion of the pre-sintered soot to the mold rod(s), and/or before the mold rod(s) is damaged by the thermal environment. The pre-sintering step may preclude some material choices for the mold rods 115B (for example, Teflon or aluminum) if the mold rods are to be removed after a sufficiently high temperature thermal treatment during pre-sintering. The steps of pre-sintering or re-sintering the soot compact 198 may also include the step of drying the soot compact. For example, to dry the soot compact 198, the mold with the soot compact may be loaded into a silica muffle in the hot zone of a tube furnace. The muffle is capped at both ends and a vacuum is pulled as the temperature of the furnace is increased to 300° C. The preform is held for 17 hours at 300° C. under a vacuum. To pre-sinter the soot compact, the muffle is then back filled with helium to 1 atmosphere, evacuated and refilled with helium to 1 atmosphere an additional time. The temperature of the tube furnace is then ramped to 900° C. and held for four hours under flowing helium. The tube furnace is then cooled. When the tube furnace reaches room temperature the helium flow is stopped and the mold is removed from the capped muffle. The pre-sintered soot compact may be removed from the mold as the diameter of the soot compact has decreased during pre-sintering. Variations in hold times and the use of additional ramps to temperatures of 400° C. to 700° C. before the 900° C. pre-sinter may be desirable to maximize glass quality. In another embodiment, the soot compact 198 is pre-sintered by placing the mold body 102 containing the optical fiber preform assembly in a tube furnace. The atmosphere of the furnace may be purged with helium and the temperature of the furnace may be increased to between about 800° C. and 1200° C. in an atmosphere of flowing helium. The furnace is held at the desired pre-sintering temperature for about 2 hours. The pre-sintered soot compact 198 may be readily removed from the mold body 102 upon cooling. For lower density compacts, or smaller diameter molds, it may be necessary or desirable to sinter the soot compact at temperatures greater than 1000° C. However, before reaching these temperatures, it may be necessary to dry the soot compact prior to sintering at these elevated temperatures to avoid the formation of undesirable cristobalite phases in the sintered silica glass. In one embodiment, to dry the soot compact, the furnace with mold and optical fiber preform assembly is heated to 1000° C. in a flowing mixture of 5% chlorine in helium gas. The furnace is held at 1000° C. for about 2 hours prior to increasing the temperature of the furnace to the pre-sintering temperature. Because the mold body 102 is exposed to chlorine vapor during the drying process, a material that is non-reactive with chlorine gas, such as carbon, should be used for the mold body 102 when it is expected that the soot compact 198 will be pre-sintered in the mold cavity 108 at temperatures over about 900° C., preferably over 1000° C., for example for 0.5 to 5 hours. Pre-sintering may be done for example, at temperatures of 1250-1400° C., for sufficient time (e.g., 0.5-5 hours, or 1-3 hrs) to provide partial densification of soot compact.

Further, the pre-sintering process described hereinabove was used to process soot compacts formed from molds having inner diameters $D_m$ of 44 mm and 89 mm. It should be understood that the pre-sintering process may be scaled and optimized for soot compacts of different dimensions.

Figure 8A:
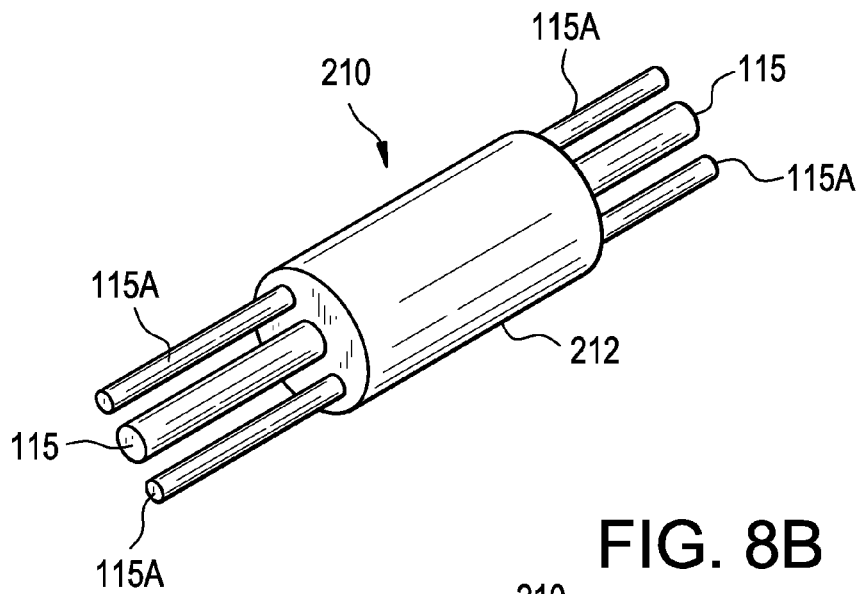
FIG. 8A depicts schematically an optical fiber preform produced according to one or more embodiments shown and described herein.
Figure 8B:
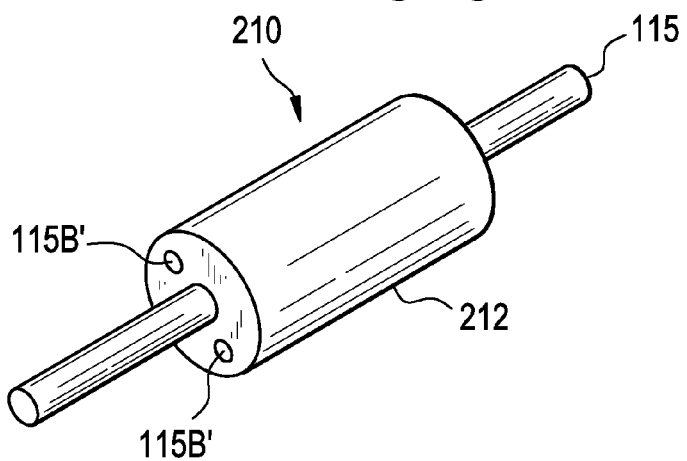
FIG. 8B depicts schematically another optical fiber preform produced according to one or more embodiments shown and described herein.

Referring now to FIG. 7, the soot compaction process described herein yields an optical fiber preform assembly 200 comprising the soot compact 198, which forms a cladding portion of the optical fiber preform assembly 200, and the glass core cane 115, which forms the core portion of the optical fiber preform assembly 200. After the optical fiber preform assembly 200 is removed from the mold, the optical fiber preform assembly 200 may be consolidated to sinter the soot compact 198, for example forming a dense silica glass cladding portion 212 around the glass core cane 115 and around the stress rods 115A, as shown, for example, in the sintered optical fiber preform 210 of FIG. 8A. The consolidation of the soot compact 198 also joins the cladding portion 212 to the glass core cane 115 and (if the stress rods are utilized) to the stress rods 115A, thereby forming an optical fiber preform 210. Alternatively, if additional core canes are utilized instead of stress rods, when the optical fiber preform assembly 200 is consolidated to sinter the soot compact 198, this forms a dense silica glass cladding portion 212 around the multiple glass core canes 115. The consolidation of the soot compact 198 also joins the cladding portion 212 to the glass core canes 115, forming an optical fiber preform 210 that contains multiple core canes. Also, alternatively, if mold rods 115B are utilized, the resultant optical fiber preform 210 may have voids or holes 115B' at locations corresponding to the locations of the previously removed mold rods (see FIG. 8B). In yet another exemplary embodiment, after partial consolidation, boron doped soot is placed in the location of holes or voids and the assembly of core cane 115, and, the partially sintered soot (corresponding to the partially sintered soot compact 198) together with the boron doped soot situated in the void(s) inside the partially sintered soot compact 198 are then sintered to attain complete densification.

If the soot compact is made of pure silica (soot) powder, and if (for the purposes of the given application) the boron doped soot is found to be too reactive with the silica powder during consolidation, a thin wall silica tube, having outside diameter just less than the inside diameter of the voids within the soot compact can be inserted into the (cylindrical) voids in the soot compact, and then inside the tubes themselves can be filled with the boron-doped-silica soot powder.

In one embodiment, the optical fiber preform assembly 200 is consolidated to an optical fiber preform 210 by affixing a handle to the glass core cane 115 and hanging the optical fiber preform assembly from a quartz immersion rod over a consolidation furnace. The consolidation furnace may generally comprise a tube furnace with a quartz muffle having a drying zone and a consolidation zone. The drying zone may be held at a temperature of about 1000° C. while the consolidation zone has a temperature gradient from about 1000° C. to about 1450° across the zone. The consolidation zone of the consolidation furnace may be maintained under a helium flow. The optical fiber preform assembly is held in the drying zone of the consolidation furnace and successively exposed to a flow of helium and oxygen and a flow of helium and chlorine in two isothermal hold periods in order to dry the optical fiber preform assembly and remove carbon, water and transition metal impurities. After the drying treatment, the atmosphere in the tube furnace is then switched to a helium flow and the optical fiber preform assembly is lowered through the consolidation zone to increase the temperature of the silica glass soot creating a vitreous flow of glass sufficient to form fully consolidated glass. Following consolidation, the consolidated optical fiber preform assembly (now optical fiber preform) is withdrawn from the consolidation furnace and loaded into a 1000° C. holding oven for at least six hours to de-gas and anneal the sample.

While the soot pressing process described herein may be optimized to improve uniformity in the density of the soot compact and thereby reduce geometrical variations in the consolidated optical fiber preform, the optical fiber preform formed by the soot pressing process may have some dimensional variation following consolidation. For example, the diameter of the cladding portion 212 of the optical fiber preform may be greater at the ends of the consolidated optical fiber preform than in the middle of the optical fiber preform such that the diameter of the optical fiber preform tapers from the ends to the middle. In one embodiment, the optical fiber preform may be machined after pre-sintering to eliminate any dimensional variations along the axial length of the optical fiber preform. For example, the optical fiber preform may be positioned in a lathe and machined to selectively reduce the diameter of certain portions of the cladding along the axial length of the optical fiber preform thereby forming an optical fiber preform with a uniform diameter.

EXAMPLES

The invention will be further clarified by the following examples.

Example 1

In this example, two optical fiber preform assemblies are prepared by loading the mold cavity with silica glass soot in a single step. To form the optical fiber preform assembly, a glass core cane 1.9 cm in diameter and two stress rods of 24 mm in diameter are positioned in a carbon mold having a mold cavity 89 mm in diameter and a length of 610 mm. The mold cavity is lined with a vitreous carbon coating. The length of the glass core cane in this example is the same as the length of the mold.

The glass core cane is positioned in the mold cavity by inserting an end of the glass core cane in the bore of a ram positioned in the lower portion of the mold cavity. The stress rods are also positioned in the mold cavity by inserting an end of each stress rod in the (off-axis) bore of a ram positioned in the lower portion of the mold cavity. About 930 g of silica glass soot is added to the mold cavity such that the glass core cane is centered in the silica glass soot and the stress rods are position off center, relatively close to the core rod. In order to achieve a particular optical fiber design, the exact position of the stress rods relative to that of the core cane in the starting configuration of the mold can be determined by calculating back from the desired fiber design, and utilizing measured shrinkage rates of the soot during consolidation. (That is, by starting with the desired configuration, and determining the starting configuration by factoring in the known shrinkage rates). It is may be necessary to measure the axial and radial soot-to-glass shrinkage because the presence of axial rods in the soot compact can constrain the axial shrinkage relative to the radial shrinkage. If the rods are aligned along a single fiber diameter, there will also be a difference in the shrinkage rates along the two orthogonal radial fiber dimensions. The adjustable parameters that are needed to complete the calculation are the soot tap density, the soot final compacted density, and the mold diameter. Vibratory energy is applied to the mold body after the silica glass soot is loaded into the mold cavity in order to maximize the pre-compression density of the silica glass soot. The top ram is positioned on the glass core cane and the stress rods and inserted in the mold cavity. In this embodiment, ram extensions are inserted into the mold cavity around the glass core cane and stress rods, and the mold and extensions are positioned in a hydraulic press. The press arm of the hydraulic press is fitted to the upper ram extension while the lower ram extension is positioned on a support plate of the hydraulic press. Vibratory energy is applied to the mold at a frequency of about 17 to 19 kHz at 51% of the power of the 5 kW amplifier. The exact preferred resonant frequency depends on details of the ultrasonic transducer, the waveguide, the clamp, and the mold, and must be optimized independently for each specific set of elements. A multimode frequency sweep of 40 Hz with a 0.026 s period is applied to the vibratory energy to avoid establishing standing waves in the mold cavity.

To compress the soot, the top ram of the press is advanced toward the bottom ram at a rate of 4.8 mm/sec. The mold is allowed to slide relative to the soot compact at a rate of about 2.4 mm/sec thereby keeping the ultrasonic source centered on the suit compact. The density of the suit can be calculated in real time throughout the pressing operation based on the measured position of the top ram in the mold cavity, the dimensions of the mold, and the mass of the soot. When the calculated density of the soot is within 0.01 g/cc of the target density (0.8 g/cc in this example), the vibratory energy is discontinued. When the calculated density of the soot reaches the target density of 0.8 g/cc, the motion of the press arm of the hydraulic press is discontinued such that only a static load of 209 lbs. remains in the hydraulic line of the press. After a period of 10 minutes, the static load is released. Thereafter, the optical fiber preform assemblies are positioned in a tube furnace and dried in a flow of helium with 5% chlorine for 1 hour at 1000° C. The optical fiber preform assemblies are then pre-sintered at 1200° C. for 1 hour and then consolidated, as described hereinabove. The diameter variation of the samples is expected to be less than about ±10% of the minimum diameter of the consolidated optical fiber preform.

Example 2

In this example, an optical fiber preform assembly is prepared by loading silica glass soot in the mold cavity in discrete portions and pressing each portion before adding a subsequent portion. To form the optical fiber preform assembly, a glass core cane 19 mm in diameter, and two stress rods of about 24 mm in diameter are positioned in a segmented aluminum mold having a mold cavity 89 mm in diameter and a length of 610 mm. The segmented mold consists of three panels each comprising $\frac{1}{3}^{rd}$ of the circumference of the mold, and are held together by bolts machined into the outer perimeter of the mold material. The mold cavity is lined with a tight fitting Teflon sheet of thickness of 0.5 mm. The length of the glass core cane and stress rods in this example is the same as the length of the mold. The glass core cane and mold rods are positioned in the mold cavity by inserting an end of the glass core cane and the ends of the mold rods in the bore of a ram positioned in the lower portion of the mold cavity.

A total of 1375 g of silica glass soot is loaded into the mold (mold cavity) in the following manner: a first portion of 275 g of silica glass soot is loaded into the mold cavity and manually pressed to a density of 0.55 g/cc positioned at the center of the mold. A second portion of 275 g of silica glass soot is loaded into one end of the mold cavity, and a third portion of 275 g of silica glass soot is loaded into the opposite end of the mold cavity. Both ends are fitted with the rams and are and manually pressed to a density of 0.47 g/cc, centered along the length of the mold cavity. A fourth portion of 275 g of silica glass soot is loaded into one end of the mold cavity, and a fifth portion of 275 g of silica glass soot is loaded into the opposite end of the mold cavity. Both ends are fitted with the rams and are and manually pressed to a density of 0.40 g/cc. The loaded soot is thus positioned in the mold cavity such that the first portion is disposed between the second and fourth portions on one side and the third and fifth portions on the other.

Thereafter, the rams are positioned on the glass core cane and stress rods and inserted in the mold cavity. Ram extensions are inserted into the mold cavity around the glass core cane and mold rods, and the mold and extensions are positioned in a hydraulic press. The press arm of the hydraulic press is fitted to the upper ram extension while the lower ram extension is positioned on a support plate of the hydraulic press.

To compress the soot, the top ram of the press is advanced toward the bottom ram at a rate of 1.6 mm/sec. The mold is allowed to slide relative to the soot compact at a rate of about 0.8 mm/sec thereby keeping the ultrasonic source centered on the suit compact. The density of the soot is calculated in real time throughout the pressing operation based on the measured position of the top ram in the mold cavity, the dimensions of the mold, and the mass of the soot. When the calculated density of the soot reaches the target density of 0.8 g/cc, the motion of the press arm of the hydraulic press is discontinued such that only a static load of about 1300 lbs. remains in the hydraulic line of the press. After a period of 60 minutes, the static load is released. The segmented mold is then disassembled and the resulting compacted preform is released from the mold and Teflon liner. The preform is then thermally treated in a helium environment by ramping to 900° C. for between 1 and 3 hours to partially sinter the preform. The optical fiber preform assembly is then consolidated, as described hereinabove.

Example 3

Figure 8C:
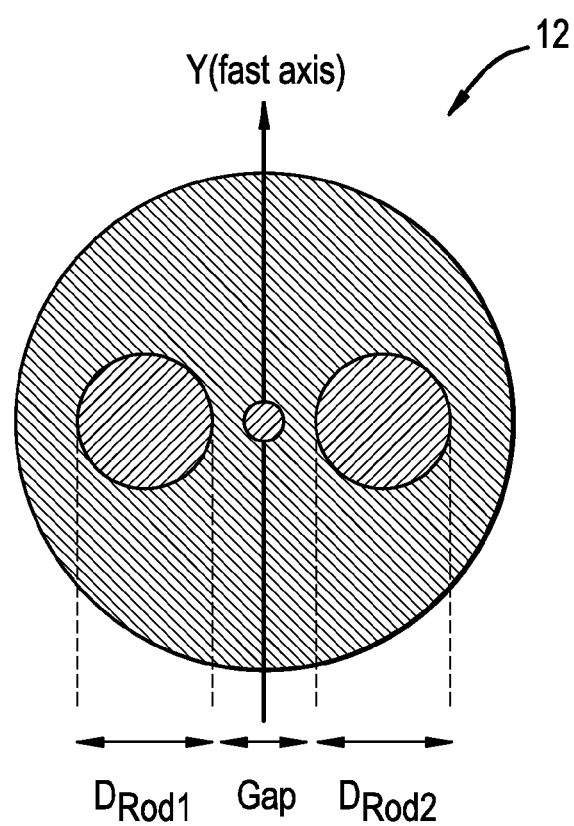
FIG. 8C depicts schematically an optical fiber produced from the optical fiber preform shown in FIG. 8A.

To manufacture an optical preform for making optical fiber, such as the single polarization and/or polarization maintaining fiber with a geometry similar to that shown in FIG. 8C, the positions of the three glass rods (a core rod and two stress rods) in mold assembly are calculated first. In this example, in order to produce a fiber preform, we start with soot that has tap density of 0.6 g/cc. Prior experiments demonstrated that a compacted preform with soot density of 0.85 g/cc. consolidates with axial shrinkage of 19% and radial shrinkage of 29%. An elliptical mold cavity and ram design can compensate for the non-circularly symmetrical position of the glass rods (i.e., for rods being located along one axis of the ellipse, and not along the other axis). In the resultant sintered preform, along the axis containing the core cane and two stress rods, only 35% of the radial profile is glass that originates from compressed soot, while in the orthogonal diameter, 89% of the glass originates from compressed soot. A mold cavity with an elliptical cross-section having a minor axis of 89 mm (along which the core and the two stress rods are located) and a major axis of 106 mm will situate glass soot along each axis such that at after being compressed to 0.85 g/cc soot density and after 29% linear (radial) soot shrinkage during consolidation, each axis will of the resultant preform will be consolidated to a 78 mm diameter, with the resultant preform having a circular cross-section. It should be appreciated that variations in shrinkage rate and in design may require that the mold and ram designs be modified to provide the optimal geometry.

To form the optical fiber preform assembly of this example, a glass core cane 8.7 mm in diameter, and two mold rods of about 21 mm in diameter are positioned in a segmented aluminum mold with an elliptical cross section having an (minor) diameter of 89 mm. The segmented mold consists of three panels each comprising $\frac{1}{3}^{rd}$ of the circumference of the mold, and are held together by bolts machined into the outer perimeter of the mold material. The mold cavity is lined with a tight fitting Teflon sheet of thickness of 0.5 mm. The length of the glass core cane and of the mold rods in this example is the same as the length of the mold. Two rams provide openings or holes (e.g., bores 110, 112) for the core cane at the center of the ellipse, and also include 21 mm diameter openings or holes (e.g., bores 110A, 112A) for the mold rods on the diameter along the minor axis of the ellipse. The glass core cane and mold rods are positioned in the mold cavity by inserting an end of the glass core cane and the ends of the mold rods in the bores of a ram positioned in the lower portion of the mold cavity.

A total of 2037 g of silica glass soot with tap density of 0.6 g/cc is loaded into the mold filling about 51 cm of height in the mold cavity. Thereafter, the rams are positioned on the glass core cane and stress rods and inserted in the mold cavity. Ram extensions are inserted into the mold cavity around the glass core cane and mold rods, and the mold and extensions are positioned in a hydraulic press. The press arm of the hydraulic press is fitted to the upper ram extension while the lower ram extension is positioned on a support plate of the hydraulic press.

To compress the soot, the top ram of the press is advanced toward the bottom ram at a rate of 1.6 mm/sec. The mold is allowed to slide relative to the soot compact at a rate of about 0.8 mm/sec thereby keeping the ultrasonic source centered on the suit compact. The density of the suit is calculated in real time throughout the pressing operation based on the measured position of the top ram in the mold cavity, the dimensions of the mold, and the mass of the soot. When the calculated density of the soot reaches the target density of 0.85 g/cc, the motion of the press arm of the hydraulic press is discontinued. After a period of 60 minutes the static load is released. The segmented mold is then dis-assembled and the resulting compacted preform is released from the mold and Teflon liner. The preform is then thermally treated in a helium environment by ramping to 900° C. for between 1 and 3 hours to partially sinter the preform. The optical fiber preform assembly is then consolidated, as described hereinabove.

Example 4

In this example, an optical fiber preform assembly is prepared by loading silica glass soot in the mold cavity containing a centered core cane, and two mold rods. The mold rods are intended to be removed after the compression step(s) to provide compacted soot with cylindrical voids. The compacted soot is then consolidated to form a preform assembly that contains cylindrical holes. More specifically, in order to form the optical fiber preform assembly of this embodiment a glass core cane 19 mm in diameter and two mold rods made of Teflon of about 24 mm in diameter are positioned in a segmented aluminum mold having a mold cavity 89 mm in diameter and a length of 610 mm. The segmented mold includes three panels each comprising $\frac{1}{3}^{rd}$ of the circumference of the mold, and are held together by bolts machined into the outer perimeter of the mold material. The mold cavity is lined with a tight fitting Teflon sheet of thickness of 0.5 mm. The length of the glass core cane and mold rods in this example is the same as the length of the mold. The glass core cane and mold rods are positioned in the mold cavity by inserting an end of the glass core cane and the ends of the mold rods in the bore of a ram positioned into the lower portion of the mold cavity.

A total of 1540 g of silica glass soot (tap density=0.6 g/cc) is loaded into the mold. The assembly is fitted with rams and ram extensions, and the mold and extensions are positioned in a hydraulic press. The press arm of the hydraulic press is fitted to the upper ram extension while the lower ram extension is positioned on a support plate of the hydraulic press.

To compress the soot, the top ram of the press is advanced toward the bottom ram at a rate of 1.6 mm/sec. The mold is allowed to slide relative to the soot compact at a rate of about 0.8 mm/sec thereby keeping the ultrasonic source centered on the suit compact. The density of the soot is calculated in real time throughout the pressing operation based on the measured position of the top ram in the mold cavity, the dimensions of the mold, and the mass of the soot. When the calculated density of the soot reaches the target density of 0.8 g/cc, the motion of the press arm of the hydraulic press is discontinued such that only a static load of about 1300 lbs. remains in the hydraulic line of the press. After a period of 60 minutes, the static load is released The segmented mold is then dis-assembled and the resulting compacted preform is released from the mold and Teflon liner. The mold rods can be gently removed from the preform assembly by manually sliding the rods out of the soot compact. The preform with cylindrical voids is then thermally treated in a helium environment by ramping to 900° C. for between 1 and 3 hours to partially sinter the preform. In one final configuration, the optical fiber preform with cylindrical voids can be consolidated to a glass article with cylindrical voids.

Example 5

In this example, an optical fiber preform assembly is prepared by loading the mold cavity with silica glass soot in a single step. To form the optical fiber preform assembly, a glass core cane 1.06 cm in diameter and six Teflon mold rods each 1.5 mm in diameter are positioned in a carbon mold having a mold cavity 89 mm in diameter and a length of 610 mm. The mold cavity is lined with a vitreous carbon coating. The length of the glass core cane in this example is the same as the length of the mold.

The glass core cane is positioned in the mold cavity by inserting an end of the glass core cane in the bore of a ram positioned in the lower portion of the mold cavity. The six mold rods are positioned in the mold cavity by inserting an end of each rod in the bore of a ram positioned into the lower portion of the mold cavity. The holes for each mold rod should allow free movement of each rod through each of the top and bottom rams. The arrangement of the mold rods is fixed by the pattern in the ram, which in this case spaces the center of the 1.5 mm holes evenly around the circumference of a circle (with radius measured from the centre of the core cane). About 1470 g of silica glass soot with tap density of 0.6 g/cc is added to the mold cavity, retaining verticality of the core cane and six mold rods. The soot column is about 40 cm in height. Vibratory energy is applied to the mold body after the silica glass soot is loaded into the mold cavity in order to maximize the pre-compression density of the silica glass soot. The top ram is positioned on the glass core cane and the mold rods taking care to align with the bottom ram and prevent any torsion in the rods. Ram extensions are inserted into the mold cavity around the glass core cane and mold rods, and the mold and extensions are positioned in a hydraulic press. The press arm of the hydraulic press is fitted to the upper ram extension while the lower ram extension is positioned on a support plate of the hydraulic press. Vibratory energy is applied to the mold at a frequency of about 20 kHz at 51% of the power of the 5 kW amplifier. A multimode frequency sweep of 40 Hz with a 0.026 sec. period is applied to the vibratory energy to avoid establishing standing waves in the mold cavity.

To compress the soot, the top ram of the press is advanced toward the bottom ram at a rate of 1.6 mm/sec. The mold is allowed to slide relative to the soot compact at a rate of about 0.8 mm/sec thereby keeping the ultrasonic source centered on the soot compact. The density of the soot can be calculated in real time throughout the pressing operation based on the measured position of the top ram in the mold cavity, the dimensions of the mold, and the mass of the soot. When the calculated density of the soot is within 0.01 g/cc of the target density (0.83 g/cc in this example), the vibratory energy is discontinued. When the calculated density of the soot reaches the target density of 0.8 g/cc, the motion of the press arm of the hydraulic press is discontinued such that only a static load of 209 lbs. remains in the hydraulic line of the press. After a period of 10 minutes, the static load is released. The mold rods can be withdrawn from the soot compact, with assistance of applied ultrasonic energy if necessary, to leave six holes in the compacted soot, arrayed around the core cane. Thereafter, the optical fiber preform assembly is positioned in a tube furnace and dried in a flow of helium with 5% chlorine for 1 hour at 1000° C. The soot preform assembly can be removed from the carbon mold, and is adherent to the central core cane. The optical fiber preform assembly is then consolidated, as described hereinabove. The preform is then drawn into optical fibers. The arrangement of the holes can encompass different combinations of hole sizes and number. In some embodiments, the total number of holes is greater than 10, in yet other embodiments greater than 50, and in yet other embodiments greater than 100. Optical fibers made with designs like this could be useful for various applications including bend insensitive fibers, photonic crystal fibers, high numerical aperture fibers, endless single mode fibers, etc.

Figure 9:
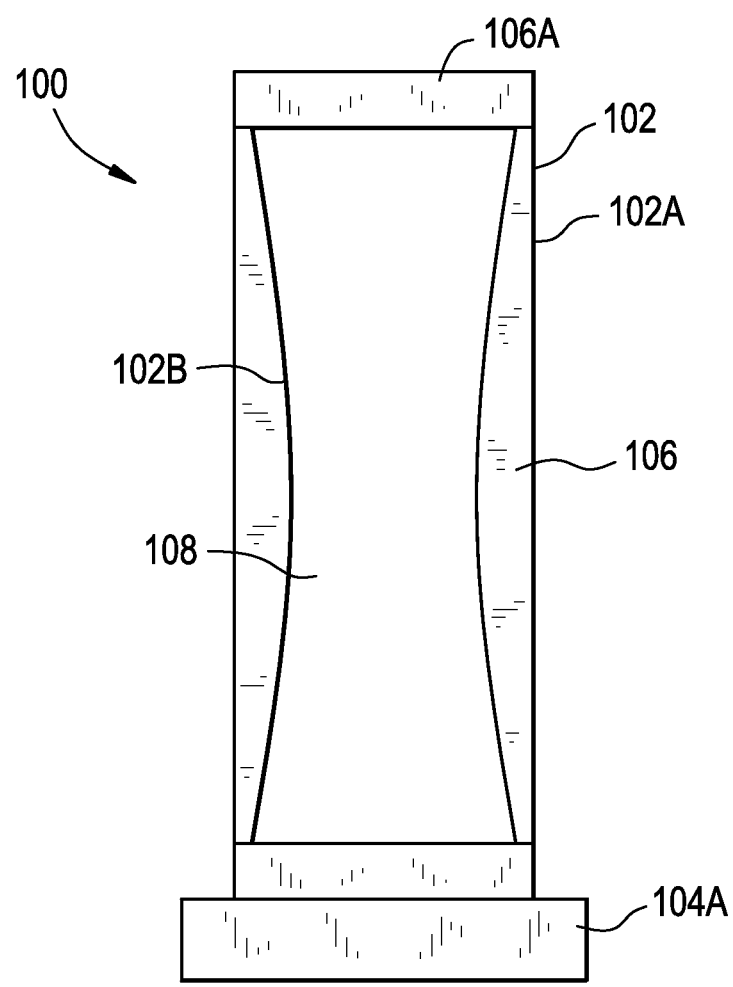
FIG. 9 illustrates schematically a partial cross-sectional side view of an apparatus that can be used in accordance with a preferred method of the present invention wherein the pressure on either side of a flexible inner wall of the apparatus is approximately equal.

Reference will now be made to FIGS. 9-14, which illustrate another exemplary embodiment of a method and apparatus in accordance with the present invention. FIG. 9 shows a partial cross-sectional side view of an apparatus (mold assembly 100) that can be used in accordance with some embodiments of the present invention. Mold assembly 100 of this embodiment includes a rigid outer wall 102A and a flexible inner wall 102B, wherein the flexible inner wall 102B surrounds an inner cavity 108 (i.e., the mold cavity) of the apparatus and the area between the rigid outer wall 102A and flexible inner wall 102B defines an annular cavity 108A. By "rigid" we mean rigid as compared to the flexible inner wall 102B and by "flexible" we mean flexible as compared to the rigid outer wall 102A. The rigid outer wall 102A of the mold assembly 100 may have a circular cross section to form a cylindrical mold, or alternatively may be elliptical, hexagonal, or even irregular in order to achieve a specific optical fiber design. In the embodiment shown in FIG. 9, the pressure on either side of the flexible inner wall 102B is approximately equal. That is, the pressure in the annular cavity 108A is approximately equal to the pressure in the mold cavity (inner cavity) 108. Apparatus 100 of this embodiment further includes a bottom (or lower) end cup or ram 104A and a top (or upper) end cap or ram 106A. The bottom (lower) end cap 104A and top or upper end cap 106A each preferably include: (i) a centerline hole, such as the bore 112, 110 (not shown), for receiving and centering a glass rod (the glass core cane); and (ii) at least one other, non-centrally located hole (e.g., bore 110A, 112A,) for receiving either stress rod(s) 115A and/or mold rod(s) 115B. The non-centrally located hole(s) 110A, 112A in the top and bottom end caps 106A, 104A may be in the form of elongated slots (e.g., an ellipse) that have their long dimension oriented along a radius, so as to allow movement of the glass rod or mold rod toward the core rod (see, for example, FIG. 11) during the radial compaction (radial pressurization). For example, an elliptical slot may have an outer radius (shorter dimension) that corresponds with the outer diameter or dimension of the non-centric rods in a designed starting arrangement (e.g., the diameter of stress or mold rods), and then extends toward the center of the end cap a sufficient length to prevent the rod from bending. Top end cap 106A and bottom end cap 104A each preferably provide a pressure seal at the top and bottom of annular cavity 108A and also each preferably allow excess air in the inner cavity 108 to escape via the centerline hole and/or via the other hole(s). Preferred materials, for end caps include metals, such as aluminum, or plastics.

Cylindrical rigid outer wall 102A of the embodiments of FIGS. 9-14 can be made of any material that has the mechanical strength to withstand, without appreciable deformation, the maximum normal operating pressures in the annular cavity 108A. In a preferred embodiment, cylindrical rigid outer wall 102A is made of aluminum. Other preferred materials for cylindrical rigid outer wall 102A include, for example, other metals or plastics. In a preferred embodiment, cylindrical rigid outer wall 102A has a substantially uniform diameter along its axial length. In alternative embodiments cylindrical rigid outer wall 102A has a diameter that varies slightly along its axial length to counter pressure differences that may exist at the top and bottom of the mold assembly (apparatus 100). Cylindrical rigid outer wall 102A may comprise a uniform cylindrical piece or it may comprise two or more cylindrical segments attached end to end.

Flexible inner wall 102B can be made of any material that has sufficient elasticity and yield strength to sufficiently elastically deform radially inwardly without suffering plastic deformation when subjected to the maximum normal operating pressures in the annular cavity 108A. In a preferred embodiment, flexible inner wall 102B is a tube made of a latex material, such as standard elastomeric latex tubing available from Piercan USA, Inc. Other preferred materials for flexible inner wall 102B include, for example, Neoprene, Buna-N, polyurethane, or silicone rubber. Preferably, flexible inner wall 102B has a tensile strength of 95 to 7,000 psi and an elongation of 200% to 800%. In a preferred embodiment, flexible inner wall 102B is sealed to cylindrical rigid outer wall 102A. The seal may be accomplished, for example, by compressing a flap (not shown) onto the outside surface of the cylindrical rigid outer wall 102A or by fixing with an adhesive. In such an embodiment, a pressurization access point and valve (not shown) can be provided in order to pressurize and depressurize annular cavity 108A. In an alternative embodiment, flexible inner wall 102B can comprise a toroidal bladder fitted into the cylindrical rigid outer wall 102A. In such an embodiment, a seal between the toroidal bladder and the cylindrical rigid outer wall 102A is not necessary.

Figure 10:
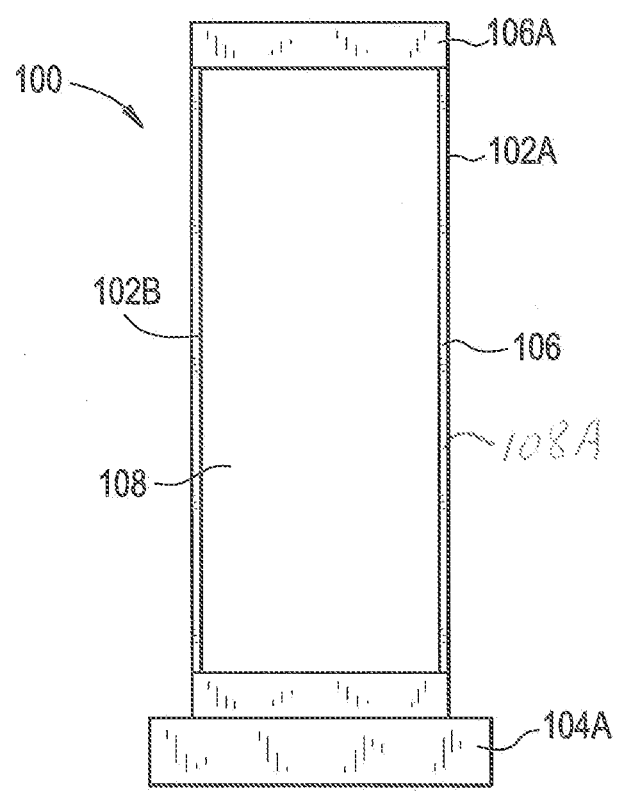
FIG. 10 illustrates schematically a partial cross-sectional side view of an apparatus that can be used in accordance with a preferred method of the present invention wherein the air between a flexible inner wall and a rigid outer wall of the apparatus has been mostly removed.

As shown in FIG. 10, annular cavity 108A can be depressurized such that air or other fluid has been mostly or nearly completely removed from annular cavity 108A. As a result of such depressurization, flexible inner wall 102B elastically deforms radially outwardly such that, as shown in FIG. 10, the maximum outer diameter of flexible inner wall 102B is nearly equal to the inner diameter of rigid outer wall 102A. Meanwhile, the volume of annular cavity 108A is decreased while the volume of inner cavity 108 is increased.

Figure 11:
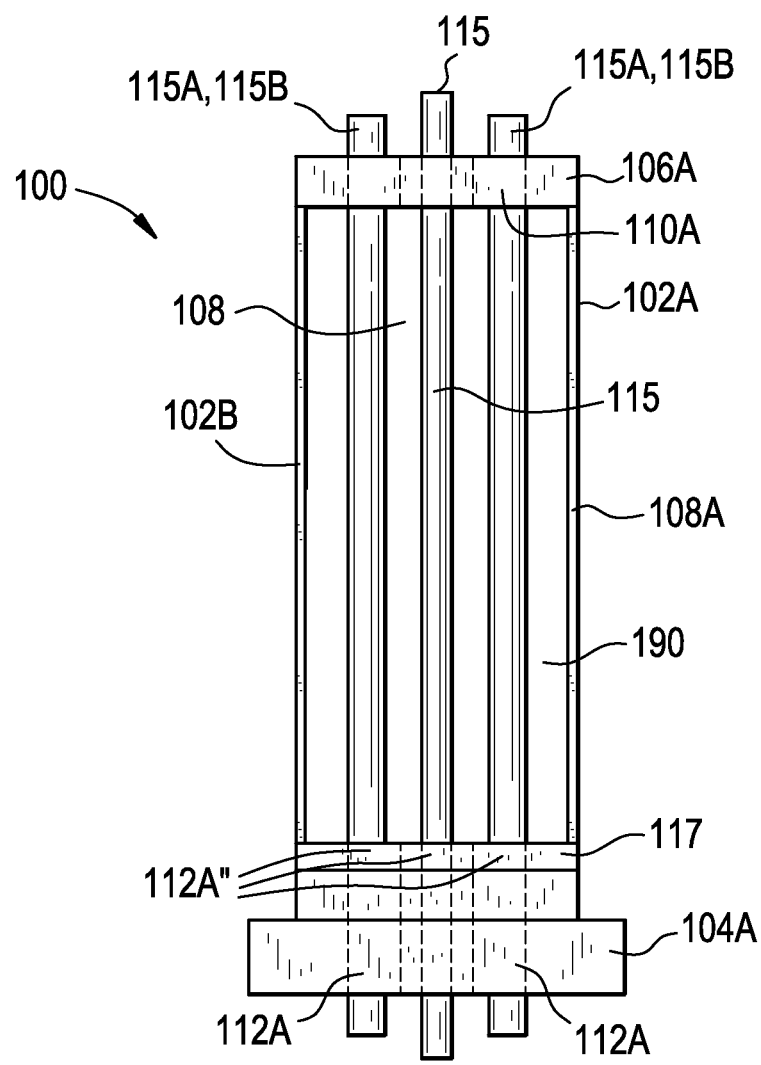
FIG. 11 illustrates schematically a partial cross-sectional side view of an apparatus that can be used in accordance with a preferred method of the present invention wherein a glass rod is centered within an inner cavity of the apparatus.

As shown in FIG. 11, a consolidated glass rod (glass core cane 115) may be placed and centered in inner cavity 108 of apparatus 100. One or more consolidated glass rods (stress rods 115A), and/or one or more mold rods 115B are also placed (off-center) in the inner cavity 108. As shown in FIG. 11, annular cavity 108A is depressurized as in FIGS. 10 and 11. Glass rod 115 (glass core cane) can extend through inner cavity 108 as well as through centerline hole (not shown) in bottom end cap 104A such that top and bottom portions of glass rod 115 extend out of apparatus 100. Similarly, glass rods 115A or mold rods 115B can extend through inner cavity 108 in bottom end cap 104A, such that top and bottom portions of rods 115A and/or 115B extend out of apparatus 100. An optional plug 117 made of, for example, foam rubber may be placed at the bottom of mold cavity (in this example, the inner cavity 108). Plug 117 has a centerline hole 117" and off-center hole(s) 112A" or receiving glass rod 115, 115A and/or 115B. Plug 117 preferably has a diameter that is about the same as the inner diameter of rigid outer wall 102A and centerline hole 117" of plug 117 preferably has a diameter that is about the same or slightly smaller than the diameter of glass rod 115 such that plug 117 fits snugly at the bottom of inner cavity 108 and around glass rod 115. Similarly the off-center hole(s) 112A" of plug 117 preferably have a diameter that is about the same or slightly smaller (in at least one cross-section) than the diameter of glass rods 115A or mold rods 115B such that plug 117 fits snugly at the bottom of inner cavity 108 and around the rods 115A, 115B. Plug 117 can serve to prevent loose soot from escaping through the bottom of the apparatus and can further serve to impart rounded or tapered ends to the pressed soot body. For example, the embodiment shown in FIG. 11 includes end caps or rams with the optionally elongated holes 110A, 112A to provide for the movement of glass rods 115A toward the core rod 115, during radial compression.

Figure 12:
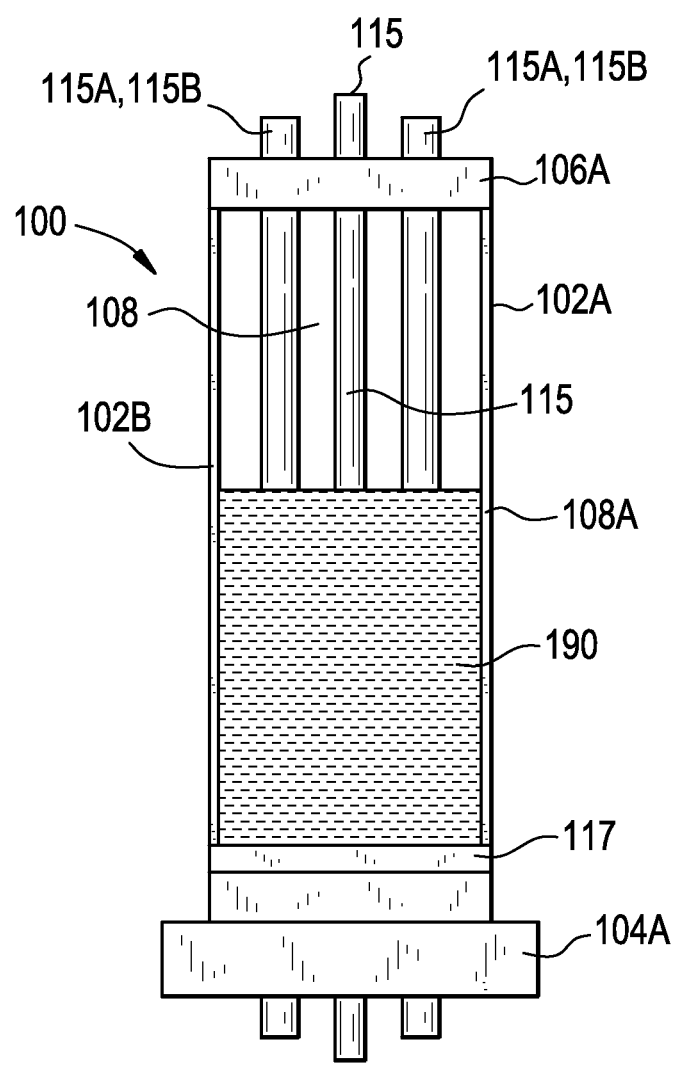
FIG. 12 illustrates schematically a partial cross-sectional side view of an apparatus that can be used in accordance with a preferred method of the present invention wherein glass soot is deposited in the inner cavity between the glass rod and the flexible inner wall.

As shown in FIG. 12, particulate glass material (such as glass soot 190), can be deposited or poured through the top of apparatus 100 into inner cavity 108 between glass rod 115, stress rod(s) 115A (and/or mold rods 115B) and flexible inner wall 102B. As shown in FIG. 12, annular cavity 108A is depressurized as in FIG. 11. While FIG. 12 shows inner cavity 108 approximately half filled with glass soot 190, in preferred embodiments, glass soot is deposited or poured into inner cavity 108 until inner cavity 108 is nearly full. Following the depositing or pouring of glass soot 190 into inner cavity 108, an additional plug (not shown) may be placed above glass soot 190 and around rods 115, 115A, and/or 115B near the top of inner cavity 108. Preferably, inner cavity 108 is depressurized following deposition of glass soot 118 into inner cavity.

Figure 13:
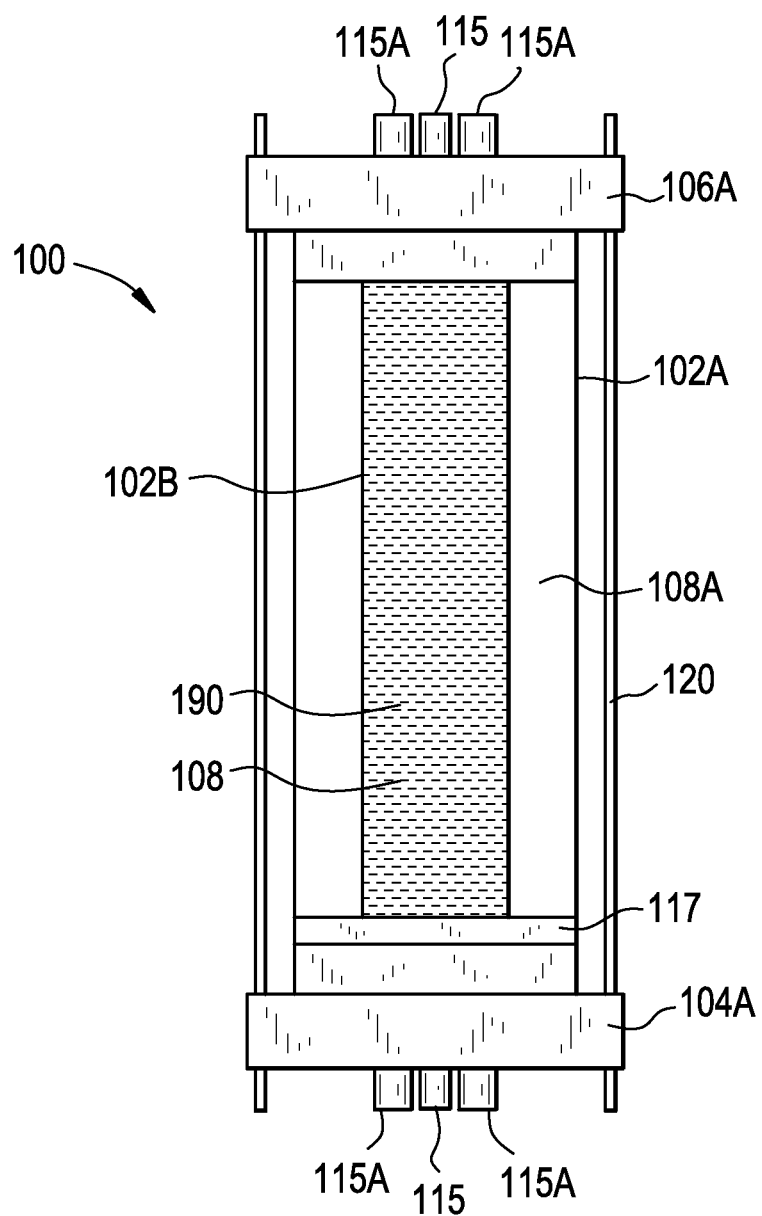
FIG. 13 illustrates schematically a partial cross-sectional side view of an apparatus that can be used in accordance with a preferred method of the present invention wherein the glass soot is pressurized by providing a pressurized fluid between the rigid outer wall and the flexible inner wall.

As shown in FIG. 13, the glass soot 190 deposited in inner cavity 108 is pressurized by providing a pressurized fluid in annular cavity 108A between rigid outer wall 102A and flexible inner wall 102B. In preferred embodiments, top end cap 106A is placed into position and connected to bottom end cap 104A using threaded rods 120. Next, fluid can be gradually introduced into annular cavity 108A such that the pressure in annular cavity gradually increases from negative to positive pressure as compared to atmospheric pressure. Preferably, the pressure in annular cavity 108A is increased at a rate of less than 50 psi/min, and even more preferably at a rate of less than 20 psi/min, such as from 2 to 20 psi/min and further such as from 5 to 15 psi/min. As the pressure of the pressurized fluid in annular cavity 108A gradually increases to increasingly higher positive gauge pressures, flexible inner wall 102B elastically deforms radially inwardly against glass soot 190 (causing the volume of annular cavity 108A to gradually increase and the volume of inner cavity 108 to gradually decrease) and glass soot 190 is pressed radially inwardly toward rod 115 and around rods 115A, 115B. Preferably, the pressure of the pressurized fluid in annular cavity 108A is increased until it reaches a maximum predetermined value. The pressure may or may not be held at this value for a predetermined amount of time. When held for a predetermined amount of time, the pressure may, for example, be held for at least 1 minute, such as from 1 minute to 10 minutes, including about 5 minutes.

In preferred embodiments, during the step of pressuring the glass soot, the pressurized fluid has a maximum pressure of from 25 psig to 250 psig, such as from 50 to 200 psig, and further such as from 75 to 150 psig. Examples of pressurized fluid include air, inert gases (e.g., nitrogen), water, and oil. A particularly preferred pressurized fluid is air. In preferred embodiments, during the step of pressurizing the glass soot, the temperature of the inner cavity 108 is less than 50° C., such as from 20° C. to 40° C., and even more preferably, room temperature (i.e., between 20° C. and 25° C.).

Figure 14:
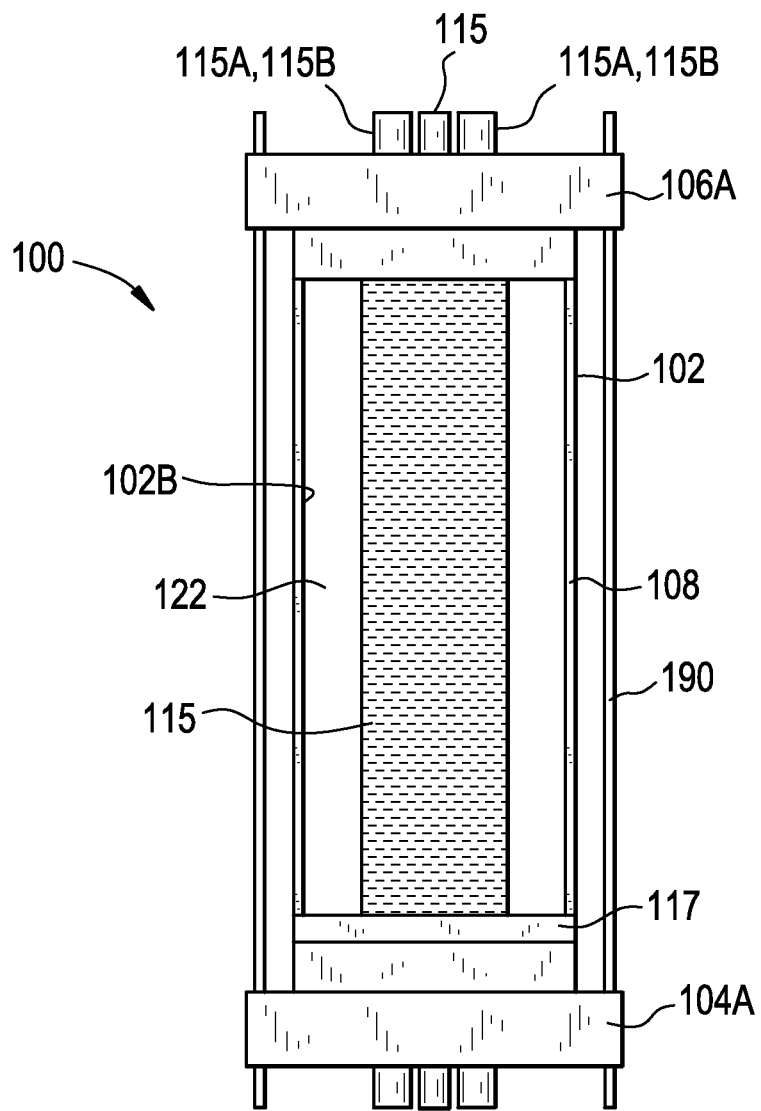
FIG. 14 illustrates schematically a partial cross-sectional side view of an apparatus that can be used in accordance with a preferred method of the present invention wherein pressurized fluid is mostly removed from between the rigid outer wall and the flexible inner wall.

After the soot as been pressed sufficiently, as shown in FIG. 14 the pressurized fluid in annular cavity 108A may be released such that annular cavity 108A is depressurized as in FIG. 10 (such that the pressure in annular cavity 108A is less than the pressure in inner cavity 108). Preferably, the pressure in annular cavity 108A is decreased at a rate of less than 50 psi/min, and even more preferably at a rate of less than 20 psi/min, such as from 2 to 20 psi/min and further such as from 5 to 15 psi/min. As the pressure in annular cavity 108A gradually decreases, flexible inner wall 102B deforms radially outwardly away from pressed glass soot 190 (causing the volume of annular cavity 108A to gradually decrease and the volume of inner cavity 108 to gradually increase) such that an annular gap 122 is present in inner cavity 108 between the outer diameter of pressed glass soot 190 and flexible inner wall 102B.

Figure 15:
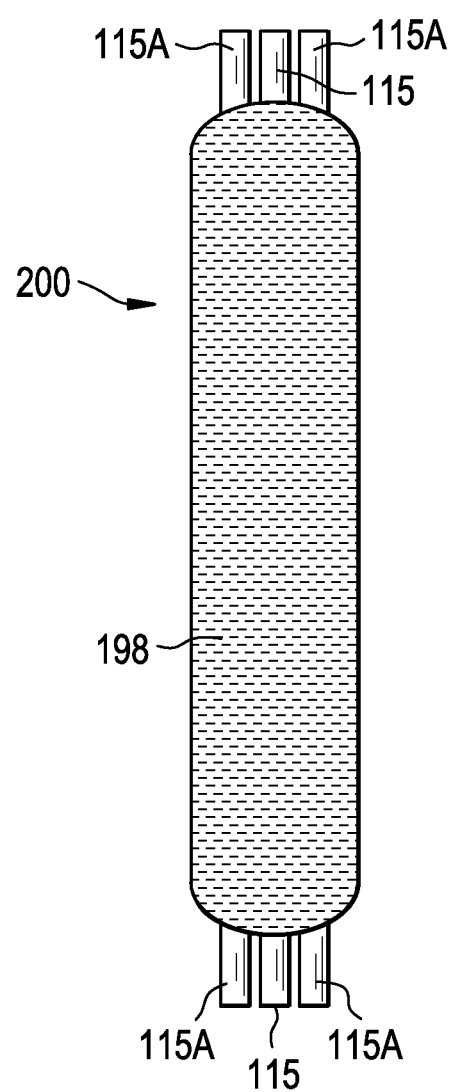
FIG. 15 illustrates schematically a partial cross-sectional side view of a pressed soot/cane assembly that is removed from the apparatus and is ready for cleaning and consolidation.

Following depressurization of annular cavity 108A, pressed soot/cane assembly or porous preform 200, an example of which is shown in FIG. 15, is ready to be removed from the apparatus for cleaning and consolidation.

Figure 16A:
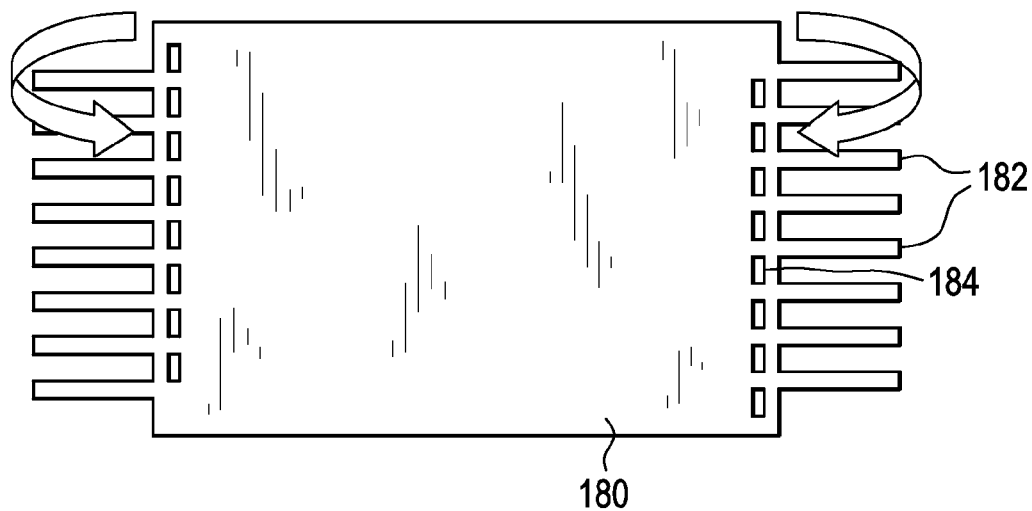
FIGS. 16A and 16B illustrate a side view of a sheet with interdigitated fingers that can be used in accordance with a preferred method of the invention wherein, in FIG. 16A the sheet is in the unrolled position and in FIG. 16B the sheet is in the rolled position.
Figure 16B:
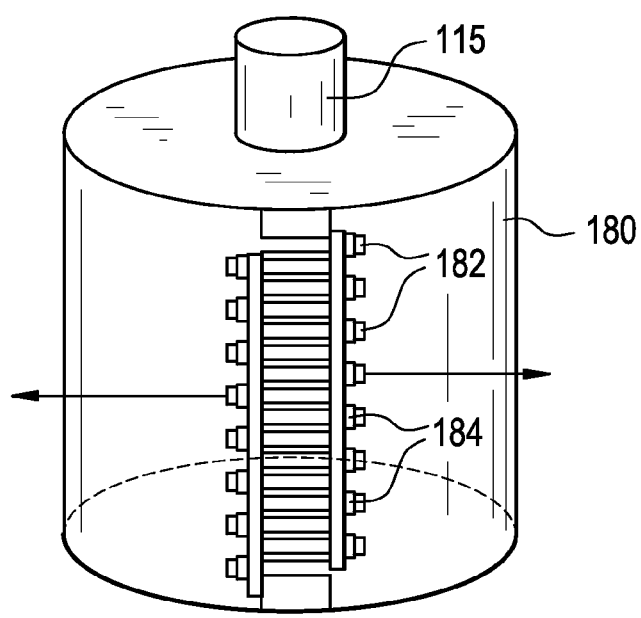

In an alternative embodiment, radially inward pressure can be applied against particulate glass soot by using as an inner wall, a sheet with interdigitated fingers that is rolled into a cylindrical form. An example of such a sheet is illustrated in FIGS. 16A and 16B, wherein, in FIG. 16A, the sheet is shown in the unrolled position and, in FIG. 16B, the sheet is shown in the rolled position. Sheet 180 includes a plurality of interdigitated fingers 182 and a plurality of slots 184 on each end, as shown in FIG. 16A. In the rolled position, interdigitated fingers 182 from each end of the sheet extend into slots 184 on the opposing end of the sheet 180, such that the interdigitated fingers 152 from opposing ends of the sheet extend in opposite directions as shown in FIG. 16B. The rolled sheet can then extend circumferentially around a glass rod 115 that may be centered in a centering hole of a centering chuck (not shown). Particulate glass soot can then be deposited or poured into the annular cavity between the rolled sheet 150, and rods 115, 115A and/or 115B after which the interdigitated fingers that extend in opposite directions can each be pulled in their respective opposing directions in order to reduce the diameter of the pulled sheet and provide a radially inward pressure against the particulate glass soot.

In preferred embodiments, the glass rod 115 is a core cane. In alternative preferred embodiments, the glass rod 115 is a core cane surrounded by a porous soot clad layer.

In preferred embodiments, porous preforms can be provided in which the particulate glass material pressurized against the glass rod has a density of at least 0.5 grams per cubic centimeter, for example 0.6 to 1.2 grams per cubic centimeter, or 0.8 to 1.0 grams per cubic centimeter, e.g., about 0.9 grams per cubic centimeter. The density of the particulate glass material pressurized against the glass rod is largely a function of the maximum pressure applied during the step of pressurizing the particulate glass material. Generally, the greater maximum pressure applied during the step of pressurizing the particulate glass material, the greater the density of that material and, hence, the greater the overall density of the porous preform. Using methods disclosed herein, for example, porous preforms having a density of at least 0.6 grams per cubic centimeter can be produced using maximum pressures of at least 50 psig; porous preforms having a density of at least 0.7 grams per cubic centimeter can be produced using maximum pressures of at least 100 psig; porous preforms having a density of at least 0.8 grams per cubic centimeter can be produced using maximum pressures of at least 150 psig, and porous preforms having a density of at least 0.9 grams per cubic centimeter can be produced using maximum pressures of at least 200 psig.

In preferred embodiments, the porous preform has a substantially uniform diameter in the axial direction. Preferably, the smallest diameter of the preform along its axial length is at least 90% of its largest diameter along its axial length. Even more preferably, the smallest diameter of the preform along its axial length is at least 95% of its largest diameter along its axial length.

Porous preforms made in accordance with embodiments disclosed herein are capable of being consolidated into a glass blank (i.e., consolidated glass preform) using standard consolidation equipment and processes and then drawn into optical fiber using standard drawing equipment and processes. Preferably, the pressed soot surrounding the cane of the porous preform will eventually form overcladding once the porous preform is consolidated and drawn into an optical fiber, such that at least 35%, and further such as at least 40%, and even further such as at least 50% of the total mass of the overcladding is derived from the pressed soot. When consolidated into a glass blank, porous preforms made in accordance with some of the embodiments disclosed herein can result in a consolidated blank such that the smallest ratio of the outer diameter of the core to the outer diameter of the cladding (i.e., the smallest core/clad ratio) is at least 98% of the largest ratio of the outer diameter of the core to the outer diameter of the cladding (i.e., the largest core/clad ratio) along the axial length of the blank.

The adhesion of the soot to the core cane and/or rods 115, 115A, 115B can be improved by creating a static charge on the core cane and/or these rods (e.g., by rubbing with a piece of silk) prior to filling the apparatus with soot. The bottom of the core cane can be optionally made to be of slightly larger diameter than the rest of the core cane, to prevent the pressed soot from slipping off the core cane, if the adhesion from pressed soot to the core cane is relatively low. For example, the magnitude of the taper can be such that the top of the core cane has a diameter about 1% smaller than the bottom of the cane, with a uniform gradient along the length of the cane. If adhesion between the glass cane and the pressed soot body is weak, the taper provides support for the blank, enabling vertical handling. In a similar way, the stress rods can be better affixed in the soot body by providing a tapered rod with the large end oriented at the top (opposite the large end of the core cane). The surface of the cane could be roughened by grinding or etching, or by applying a thin layer of soot by OVD (Outside Vapor Deposition process).

The following examples illustrate a method and an apparatus that utilize radial pressure, directed inward toward the center of the mold cavity, to compact particulate glass material for making the cladding portion of the optical preform.

Example 6

An optical fiber preform is made using an apparatus having a rigid cylindrical outer wall and a flexible inner wall. The rigid cylindrical outer wall is made of aluminum having an inner diameter of 4 inches, a length of 18 inches, and a wall thickness of ¼ inch. The flexible inner wall is a latex rubber tube having a diameter of about 2.5 inches in the unstressed state. The top and bottom ends of the latex rubber tube are wrapped over the top and bottom ends of the aluminum cylinder. The apparatus further includes top and bottom aluminum end caps, each end cap having a thickness of about 1 inch, a center hole to accommodate: (i) a core cane, (ii) two off-center rods to accommodate two stress rods 115A and (iii) four peripheral holes for accommodating threaded rods.

The air between the flexible inner wall and rigid outer wall is substantially removed so that the outside diameter of the flexible inner wall is essentially the same as the inside diameter of the rigid outer wall. Then a one inch thick, open-pored silicone rubber foam plug with approximately the same diameter as the inside diameter of the rigid cylinder is inserted into the cavity so that it is flush with the bottom of the cylinder. The bottom of the cylinder is then sealed with an aluminum end-cap and a Viton o-ring. To accommodate the motion of the stress rods (located off-center), the aluminum end caps of this exemplary apparatus have slotted (elongated) holes. These elongated holes (e.g., bores 110A, 112A) have a width sufficient to allow the glass rod(s) to fit in, and be aligned radially (with the longer axis) toward the center of the mold cavity. The purpose of the elongated hole is to allow the glass rod (e.g., stress rods, core canes) to be placed on the outer edge of the slot during the soot filling process, and then to traverse toward the center line as the soot is compacted radially. In this example the slotted or elongated hole is 2.1 cm wide and its outer edge is positioned at 4.2 cm from the center of the mold cavity, and the inner edge of the slotted hole is positioned 1.7 cm from the center of the mold cavity. (For a 2.1 cm diameter stress rod, this allows 0.4 mm of movement toward the center of the mold during compaction of the soot.) A 10 mm diameter fused silica core cane is placed inside the mold cavity with its bottom end inserted into a hole at the center of the bottom plug. The top of the core cane can be kept centered, for example by utilizing known centering devices/mechanisms or methods, for example by using a temporary disk made of PTFE (i.e., when all the soot is in the cavity, the disk is taken out). Two 21 mm diameter fused boron-doped silica rods are then placed inside the cavity with their bottom ends inserted into slotted holes situated off-center in the bottom plug. The boron-doped silica stress rods are in contact with and are adjacent to the outer edge of the slotted holes. The top of the stress rods is kept in their proper positions by using any of the known centering devices/mechanisms or methods. Waste silica soot from an OVD overcladding process with a tap density of 0.6 g/cc is then loaded into the cavity while occasionally tapping the size of the rigid cylinder to ensure consistent compaction of the soot. When the soot reaches a level about one inch below the top of the cylinder, the centering jig is removed and a second silicone rubber foam plug is slid into place. The top of the cylinder is sealed, for example, with a second aluminum end-cap and Viton O-ring. The top aluminum end cap is preferably fitted with the same slot and hole arrangement as the bottom end cap, carefully aligning with the lower plate, so that radial movement of the off-center glass rods retains them parallel to the center glass core cane throughout the compaction (or the pressure application) step. The top and bottom end-caps are secured onto the ends of the cylinder by connecting them to each other with threaded rods and tightening with wing nuts. The inner cavity is then evacuated through the top end-cap. The space between the flexible wall and rigid wall can be then pressurized to 150 psig over a period of 10 minutes using a compressed air cylinder. The pressure is maintained at 150 psig for approximately 5 minutes. The inner cavity is then allowed to return to atmospheric pressure. The pressure from the annular cavity is then bled off over a period of 10 minutes through a valve on the side of the cylinder. The top end-cap is then removed and the air in the annular cavity is pumped out so that the diameter of the flexible wall is large enough to remove the top foam plug and the soot preform. The resulting soot preform has a diameter of about 89 mm and a density of about 0.8 g/cc.

The soot preform is heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned preform is then consolidated in a vertical down-drive furnace. For example, the furnace can be purged at 1000 C in 10% oxygen for one hour, then 5% chlorine for one hour, then the preform can be fully sintered in helium by translating at 10 mm/min from 1000° C. to ° C. and then 1.5 mm/min from 1430° C. to a peak of 1466 C then back to 1430° C.

Example 7

This example is similar to Example 6, but instead of two boron doped consolidated glass rods, two 21 mm diameter cylindrical aluminum mold rods are placed inside the cavity with their bottom ends inserted into holes situated off-center in the bottom plug. The top of mold rods can be kept centered (i.e., the rods are kept in the proper locations (so that the line connecting the centers of the rods intersect the center of the core rod) using, for example a temporary disk made of PTFE. Then the top end-cap is removed and the air in the annular cavity is pumped out so that the diameter of the flexible wall is large enough to remove the top foam plug and the soot preform. The resulting soot preform has a diameter of about 89 mm. The two mold rods can be carefully extracted from the compressed soot (soot compact), leaving two air holes with a diameter of 21 mm within the soot, with a soot density of about 0.8 g/cc.

The soot preform is heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned preform is then consolidated in a vertical down-drive furnace. For example, the furnace can be purged at 1000° C. in 10% oxygen for one hour, then 5% chlorine for one hour, then the preform can be fully sintered in helium by translating at 10 mm/min from 1000° C. to at 1000° C. in 10% oxygen for one hour, then 5% chlorine for one hour, then the preform can be fully sintered in helium by translating at 10 mm/min from 1000° C. to ° C. and then 1.5 mm/min from 1430° C. to a peak of 1466° C. then back to 1430° C., leaving a consolidated glass article (preform) with two cylindrical air holes positioned around the central core cane. This preform can be further modified by filling the cylindrical air holes with a boron doped silica powder, or a boron doped glass rod. The sintered preform containing boron doped silica powder or boron doped silica (stress) rod is then re-sintered, for example, by heating it to a peak temperature of 1400° C.-1500° C., for a sufficient time for the boron soot to sinter (or for the boron doped silica (stress) rod to permanently adhere to the surrounding silica glass. For example, the sintered preform with boron doped silica powder is re-sintered to a peak of 1466° C. by translating at 10 mm/min from 1000° C. to 1430° C. and then 1.5 mm/min from 1430° C. to a peak of 1466° C. then back to 1430° C., to fully sinter boron doped silica powder (soot) inside the sintered preform.

It is recognized that other material compositions can be filled into the cylindrical air holes, including metals such as Cu, Ag, Au, W, and Ga, or semiconductors such as $Si_3N_4$ or $Si_3N_4$/SiC, and formed into a fiber preform.

Example 8

This example is similar to Example 6, but instead of two boron doped consolidated glass rods, in this example two 21 mm diameter cylindrical aluminum mold rods are placed inside the cavity with their bottom ends inserted into holes situated off-center of the bottom plug.

The top of mold rods are kept in the proper locations (so that the line connecting the centers of the mold rods intersect the center of the core rod) by using any known mechanism or method(s). Then the top end cap is removed and the air in the annular cavity is pumped out so that the diameter of the flexible wall is large enough to remove the top foam plug and the soot preform. The resulting soot preform assembly has a diameter of about 89 mm. The two mold rods can be carefully extracted from the blank assembly, leaving two air holes with a diameter of 21 mm and surrounded by compacted soot with a soot density of about 0.8 g/cc. The air holes can be filled with a particulate glass, for example boron doped glass powder. Preferably the powder should have a tap density equal to the pressed density of the soot. A tapered glass plug can be fitted into the bottom of the air holes, and the boron doped glass powder filled into the air holes. In another configuration, a thin wall silica tube having a diameter slightly less than 21 mm, can first be fitted in the air hole, and then itself be plugged and filled with the boron doped glass powder.

The soot preform assembly, including either the glass powder or silica tube(s) filled with glass powder, is heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned preform is then consolidated in a vertical down-drive furnace. For example, the furnace can be purged at 1000° C. in 10% oxygen for one hour, then 5% chlorine for one hour, then the preform can be fully sintered in helium by translating at 10 mm/min from 1000° C. to at 1000° C. in 10% oxygen for one hour, then 5% chlorine for one hour, then the preform can be fully sintered in helium by translating at 10 mm/min from 1000° C. to ° C. and then 1.5 mm/min from 1430° C. to a peak of 1466° C. then back to 1430° C.

The boron-doped soot consolidates with the compacted soot, and fills the two air hole regions formed by the removal or the two mold rods.

Example 9

This example is similar to Example 6, but instead of two boron doped consolidated glass rods, in this example four 21 mm diameter consolidated core rods (or core canes) 115 are placed inside the cavity with their bottom ends inserted into holes situated off-center of the bottom plug. After the soot preform is removed from the inner cavity, the resulting soot preform has a diameter of about 89 mm and a density of about 0.8 g/cc.

The soot preform preform with multiple core rods is then heated in a tube furnace at a rate of 5° C./minute first in a flow of 500 sccm oxygen from room temperature to 800° C. in order to remove organic contaminants and then in a flow of 500 sccm of a mixture of 5% chlorine in helium from 800 to 1200° C. to remove metallic contaminants. The cleaned preform with multiple core rods therein is then consolidated in a vertical down-drive furnace. For example, the furnace can be purged at 1000 C in 10% oxygen for one hour, then 5% chlorine for one hour, then the preform can be fully sintered in helium by translating at 10 mm/min from 1000° C. to ° C. and then 1.5 mm/min from 1430° C. to a peak of 1466 C then back to 1430° C.

Example 10

Figure 17A:
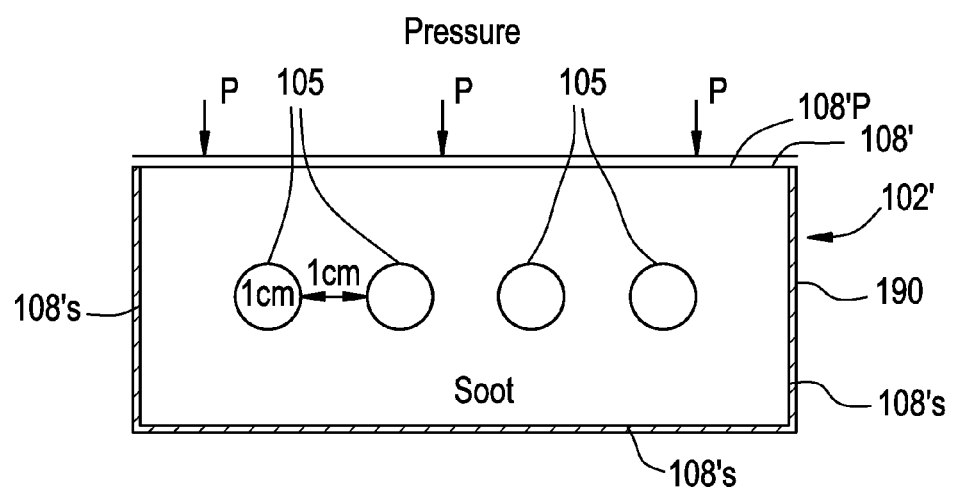
FIGS. 17A-17C are schematic depictions of three more exemplary mold assemblies for forming optical fiber preforms according to one or more embodiments shown and described herein.

This example is similar to Example 9, but several consolidated glass rods, for example four 10 mm diameter consolidated core canes 115 are placed inside a comprises mold cavity 108' with a rectangular cross section. Preferably the centers of the core canes are co-linear. More specifically, in this embodiment, the rectangular-shaped mold body 102' comprises mold cavity 108' that is 4 cm deep and 10 cm wide. As shown in FIG. 17A, the mold cavity 108' of this embodiment includes three fixed solid walls 108'$_S$, a forth (flexible) wall 108'$_F$ made of a flexible film, such as latex or silicone rubber and the bottom and top plugs 108'$_P$ (not shown). The bottom ends of the core canes 115 are inserted into receiving holes situated off-center on the bottom plug. The length of the glass core canes 115 in this example is the same, or slightly longer than the length of the mold cavity 108'.

The soot 190 is added into the mold cavity, and pressure P is applied to the soot via the flexible wall 108'$_F$. As a result of the mold cavity geometry, the width of the compressed soot with multiple core canes therein is fixed and equal to 10 cm. The compressed soot preform is then removed from the mold cavity. The resulting soot preform is approximately rectangular and its density is about 0.8 to 0.85 g/cc.

The soot preform with multiple core rods is then heated as disclosed in example 9 to remove metallic contaminants. The cleaned preform with multiple core rods therein is then consolidated in a vertical down-drive furnace and can be utilized for manufacturing optical fiber with multiple cores, or to make multi-core ribbons.

Example 11

Figure 17B:
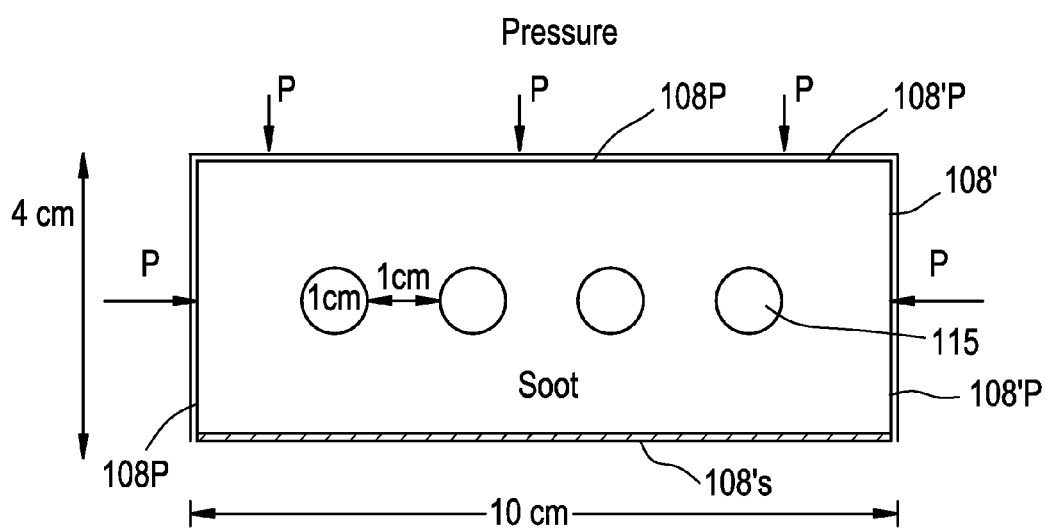

This example is similar to Example 10, with several consolidated glass rods, for example four 21 mm diameter consolidated core rods (or core canes) 115 placed inside the cavity with a rectangular cross section. Preferably, the centers of the core canes are co-linear. More specifically, in this embodiment, the rectangular-shaped mold body 102' comprises mold cavity 108' that is 4 cm deep and 10 cm long. As shown in FIG. 17B, the mold cavity 108' of this embodiment includes one fixed (rigid) solid wall 108'$_S$ and three (flexible) walls 108'$_F$ made of a flexible film, such as latex or silicone rubber, as well as and two plugs 108'$_P$ (not shown). The bottom ends of the core canes 115 are inserted into receiving holes situated off-center on the bottom plug (not shown). The length of the glass core canes 115, in this exemplary embodiment, is the same, or slightly longer than the length of the mold cavity.

The soot 190 is added into the mold cavity, and pressure P is applied to the soot through the three flexible walls 108'$_F$. More specifically, in order to form soot compact 198 around the core canes, pressure P is applied evenly at three walls during soot compression, while the fourth wall 108'$_S$ is presents a firm flat surface. As a result of the mold cavity geometry, cross-sectional geometry of the resultant preform assembly is similar to initial cavity's geometry, with a similar aspect ratio of 1×2. After the compressed soot preform is removed from the mold cavity, the resulting soot preform has a width of about 6 cm and a density of about 0.85 g/cc.

The compressed soot preform is then removed from the mold cavity. The soot preform with multiple core rods is then heated as disclosed in example 10 to remove metallic contaminants. The cleaned preform with multiple core rods therein is then consolidated in a vertical down-drive furnace and can be utilized for manufacturing optical fiber with multiple cores, or to make multi-core ribbons.

Example 12

Figure 17C:
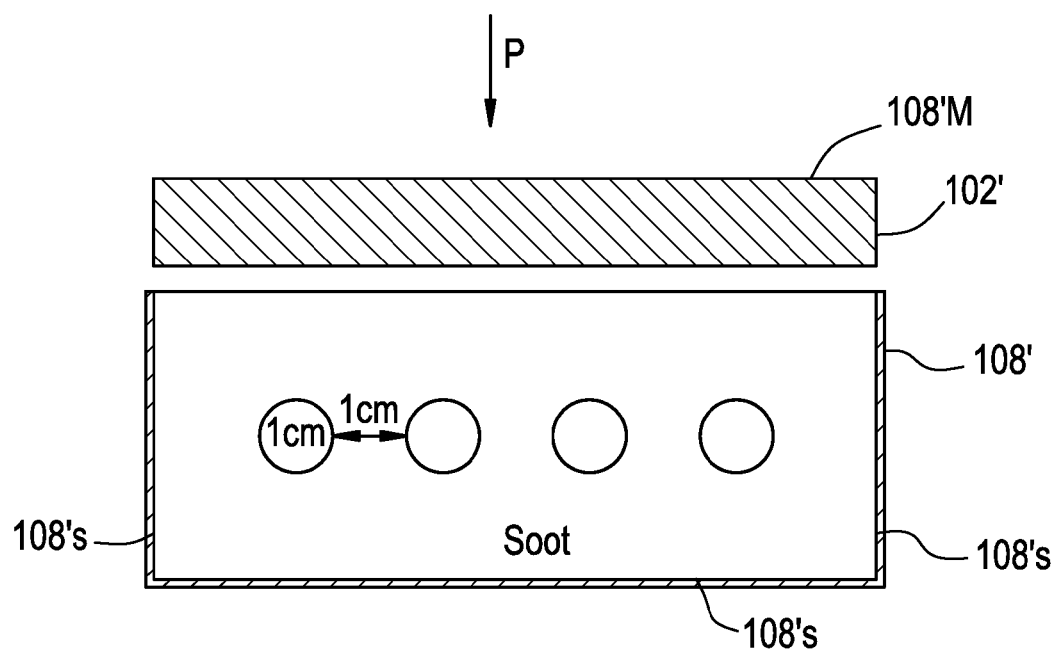

This example is similar to Example 10, with several consolidated glass rods, for example four 10 mm diameter consolidated core rods (or core canes) 115 placed inside the cavity with a rectangular cross section. Preferably, the centers of the core canes 115 are collinear. More specifically, in this embodiment, the rectangular-shaped mold body 102' comprises mold cavity 108' that is 4 cm deep and 10 cm wide. As shown in FIG. 17C, the mold cavity 108' of this embodiment includes three fixed (rigid) walls 108'$_S$, a forth rigid, but movable wall 108'$_M$. The wall 108'$_M$ can move and be used as a piston applying pressure to the soot situated inside the mold cavity. During the soot compression, only this wall 108'$_M$ moves while positions of three other walls are fixed. With compression approach the resulting soot preform geometry is close to rectangular, with one side dimension (width) being equal to 10 cm. After the compressed soot preform is removed from the inner cavity, the resulting soot preform has a thickness of about 25 mm and a density of about 0.8 g/cc. Post-compression treatment of the compressed soot preform can be similar to that of examples 10 and 11.

Example 13

This example is similar to Example 1, but instead of two stress rods, in this example two additional 1.9 cm diameter consolidated core rods (or core canes) 115 are placed inside the cavity. In this example, two optical fiber preform assemblies are prepared by loading the mold cavity with silica glass soot in a single step. To form the optical fiber preform assembly, the tree core canes are positioned in a carbon mold having a mold cavity 89 mm in diameter and a length of 610 mm. The mold cavity is lined with a vitreous carbon coating. The length of the glass core cane in this example is the same as the length of the mold.

The glass core cane is positioned in the mold cavity by inserting an end of the glass core cane in the bore of a ram positioned in the lower portion of the mold cavity. The other core canes are positioned in the mold cavity by inserting an end of each core in the (off-axis) bore of a ram positioned in the lower portion of the mold cavity. About 930 g of silica glass soot is added to the mold cavity such that one glass core cane is centered in the silica glass soot and the additional two core canes are positioned off center, relatively close to the central core rod. Preferably, the centers of the three core canes are collinear. It is may be necessary to measure the axial and radial soot-to-glass shrinkage because the presence of axial rods in the soot compact can constrain the axial shrinkage relative to the radial shrinkage. If the multiple rods are to be aligned along a single fiber diameter, there will also be a difference in the shrinkage rates along the two orthogonal radial fiber dimensions. The adjustable parameters that are needed to complete the calculation are the soot tap density, the soot final compacted density, and the mold diameter. Vibratory energy is applied to the mold body after the silica glass soot is loaded into the mold cavity in order to maximize the pre-compression density of the silica glass soot. The top ram is positioned on the glass core cane and the stress rods and inserted in the mold cavity. In this embodiment, ram extensions are inserted into the mold cavity around the glass core cane and stress rods, and the mold and extensions are positioned in a hydraulic press. The press arm of the hydraulic press is fitted to the upper ram extension while the lower ram extension is positioned on a support plate of the hydraulic press. Vibratory energy is applied to the mold at a frequency of about 17 to 19 kHz at 51% of the power of the 5 kW amplifier. The exact preferred resonant frequency depends on details of the ultrasonic transducer, the waveguide, the clamp, and the mold, and must be optimized independently for each specific set of elements. A multimode frequency sweep of 40 Hz with a 0.026 s period is applied to the vibratory energy to avoid establishing standing waves in the mold cavity.

To compress the soot, the top ram of the press is advanced toward the bottom ram at a rate of 4.8 mm/sec. The mold is allowed to slide relative to the soot compact at a rate of about 2.4 mm/sec thereby keeping the ultrasonic source centered on the suit compact. The density of the suit can be calculated in real time throughout the pressing operation based on the measured position of the top ram in the mold cavity, the dimensions of the mold, and the mass of the soot. When the calculated density of the soot is within 0.01 g/cc of the target density (0.8 g/cc in this example), the vibratory energy is discontinued. When the calculated density of the soot reaches the target density of 0.8 g/cc, the motion of the press arm of the hydraulic press is discontinued such that only a static load of 209 lbs. remains in the hydraulic line of the press. After a period of 10 minutes, the static load is released. Thereafter, the optical fiber preform assemblies are positioned in a tube furnace and dried in a flow of helium with 5% chlorine for 1 hour at 1000° C. In this embodiment, the optical fiber preform assemblies with multiple core rods are preferably pre-sintered at about 1200° C. for 1 hour and then consolidated, as described hereinabove.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for making an optical fiber preform comprising the steps of:
    depositing a plurality of rods into a mold cavity of an apparatus having an inner wall;
    depositing particulate glass material in the mold cavity between the rods and the inner wall; and
    applying 25 psig to 250 psig of pressure against the particulate glass material to pressurize the particulate glass material against the plurality of rods, creating a soot compact.

2. The method for making an optical fiber preform according to claim 1, wherein the pressure is applied at least radially inwards against the particulate glass material to pressurize the particulate glass material against the rods.

3. The method of claim 2, wherein said apparatus further comprises an outer wall, the outer wall surrounding the inner wall, and the inner wall surrounding the mold cavity, and the step of applying a radially inward pressure comprises providing a pressurized fluid between the outer wall and the inner wall.

4. The method of claim 3, wherein the pressurized fluid is air.

5. The method of claim 2, wherein the inner wall comprises a flexible material having a tensile strength of 95 to 7,000 psi and an elongation of 200% to 800%.

6. The method of claim 2, wherein the inner wall comprises a toroidal bladder.

7. The method for making an optical fiber preform according to claim 1, wherein said plurality of rods comprising: (i) at least one glass rod and at least one mold rod; or (ii) at least two glass rods; and said pressure is applied axially and/or radially.

8. The method of claim 7 further comprising applying vibratory energy to the mold cavity as the silica glass soot is compressed.

9. The method of claim 8 wherein the vibratory energy comprises multiple frequency modes and the multiple frequency modes are swept over a range of frequencies.

10. The method of claim 7, wherein at least one of the glass rods comprises a consolidated core cane surrounded by a porous soot clad layer and said core cane is situated along the axial center of said mold cavity.

11. The method of claim 7, wherein one of said at least two glass rods is a consolidated B doped silica rod.

12. The method of claim 7, wherein prior to the step of applying a radial pressure against the particulate glass material, the particulate glass material has an average density of from 0.1 to 0.5 grams per cubic centimeter and wherein subsequent to the step of applying a radial pressure against the particulate glass material, the pressurized particulate glass material has a density of from 0.6 to 1.2 grams per cubic centimeter.

13. The method of claim 7, wherein subsequent to the step of applying a radial pressure against the particulate glass material, the pressurized particulate glass material has a density of from 0.6 to 1.2 grams per cubic centimeter.

14. The method of claim 1, wherein said rods are multiple core canes.

15. The method of claim 14 wherein said core canes are arranged co-linearly within the mold cavity.

16. The method of claim 14 wherein the pressure is applied to one or more sides of the mold cavity.

17. The method of claim 14 wherein the mold cavity does not have circular symmetry.

18. The method of claim 1 further comprising:
    compressing the particulate glass material in an axial direction to form the soot compact having a density of at least 0.5 g/cc, where the soot compact is a cladding portion of the optical fiber preform.

19. The method of claim 18, wherein said particulate glass material is silica soot, and wherein the silica glass soot is loaded by:
    loading the mold cavity with a first portion of silica glass soot;
    compacting the first portion of silica glass soot;
    loading the mold cavity with a second portion of silica glass soot; and
    compacting the second portion of silica glass soot.

20. The method of claim 19, further comprising applying vibratory energy to the mold cavity as the first portion of silica glass soot and the second portion of silica glass soot are loaded into the mold cavity.

21. The method of claim 1, wherein at least one of said rods is a consolidated glass rod.

22. The method of claim 1, wherein at least one of said rods is a core cane situated along the axial center of said mold cavity.

23. The method of claim 1, wherein the particulate glass material is waste soot from a chemical vapor deposition (CVD) operation.

24. The method of claim 1, wherein during the step of applying pressure against the particulate glass material, the temperature of the inner cavity is less than 50° C.

25. The method of claim 1, wherein the preform has a largest and smallest diameter along its axial length, wherein the smallest diameter is at least 90% of the largest diameter.

26. The method of claim 1, wherein the pressure is from 50 psig to 200 psig and the smallest diameter of said optical fiber preform is at least 90% of the largest diameter.

27. The method of claim 1, wherein subsequent to the step of applying a pressure against the particulate glass material, the pressurized particulate glass has a density of from 0.8 to 1.0 grams per cubic centimeter.

28. The method of claim 25, wherein the smallest diameter is at least 95% of the largest diameter.

29. The method of claim 1 further comprising:
    pre-sintering the soot compact; and machining the soot compact after pre-sintering.

30. The method of claim 1 wherein said rods are arranged co-linearly within the mold cavity.

31. A method for making an optical fiber preform with an apparatus comprising an inner wall, an outer wall, and a mold cavity, the outer wall surrounding the inner wall and the inner wall surrounding the mold cavity, said method comprising the steps of:
    depositing a plurality of rods into the mold cavity;

depositing particulate glass material in the mold cavity between the rods and the inner wall; and applying 25 psig to 250 psig of pressure against the particulate glass material to pressurize the particulate glass material against the plurality of rods, wherein the pressure is applied at least radially inwards against the particulate glass material to pressurize the particulate glass material against the rods and, wherein the inner wall comprises a rolled sheet with interdigitated fingers, and the step of applying a radially inward pressure comprises pulling the interdigitated fingers in opposite directions in order to reduce the diameter of the rolled sheet.

* * * * *